United States Patent
Ikeda et al.

(10) Patent No.: US 12,386,174 B2
(45) Date of Patent: Aug. 12, 2025

(54) ELECTRONIC DEVICE WITH DISPLAY APPARATUS HAVING LIGHT-EMITTING DEVICE AND LIGHT-RECEIVING DEVICE OVER INSULATING LAYER

(71) Applicant: SEMICONDUCTOR ENERGY LABORATORY CO., LTD., Atsugi (JP)

(72) Inventors: Hisao Ikeda, Kanagawa (JP); Yosuke Tsukamoto, Kanagawa (JP); Kensuke Yoshizumi, Kanagawa (JP); Naoto Kusumoto, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/558,214

(22) PCT Filed: Apr. 25, 2022

(86) PCT No.: PCT/IB2022/053806
§ 371 (c)(1),
(2) Date: Oct. 31, 2023

(87) PCT Pub. No.: WO2022/234383
PCT Pub. Date: Nov. 10, 2022

(65) Prior Publication Data
US 2024/0219714 A1    Jul. 4, 2024

(30) Foreign Application Priority Data
May 7, 2021    (JP) .................................. 2021-079056

(51) Int. Cl.
*G02B 27/00*    (2006.01)
*G02B 27/01*    (2006.01)
*G06F 3/01*    (2006.01)

(52) U.S. Cl.
CPC ..... *G02B 27/0093* (2013.01); *G02B 27/0172* (2013.01); *G06F 3/013* (2013.01); *G06F 3/017* (2013.01)

(58) Field of Classification Search
CPC . G02B 27/0093; G02B 27/0172; G06F 3/013; G06F 3/017
See application file for complete search history.

(56) References Cited

U.S. PATENT DOCUMENTS 6,433,760 B1    8/2002    Vaissie et al.
7,399,991 B2    7/2008    Seo et al.
(Continued)

FOREIGN PATENT DOCUMENTS

CN    109715047 A    5/2019
EP    1755441 A    2/2007
(Continued)

OTHER PUBLICATIONS

International Search Report (Application No. PCT/IB2022/053806) Dated Jul. 5, 2022.
(Continued)

*Primary Examiner* — Lisa S Landis
(74) *Attorney, Agent, or Firm* — Fish & Richardson P.C.

(57) ABSTRACT

An electronic device capable of detecting a user's body movements is to be provided. The electronic device is display equipment worn in front of the user's eye and capable of detecting the blinking action. The electronic device includes a display apparatus and a light source in a housing, and the display apparatus includes a light-emitting device and a light-receiving device in a display portion. Light emitted by the light source is incident on the user's eye and the vicinity thereof through a mirror and reflected, and the reflected light is detected by the light-receiving device. The amount of light reflected by the eyelid and that by the
(Continued)

eyeball are different from each other, which enables the blinking action to be detected. The detection of the blinking action enables the user's fatigue state to be estimated.

14 Claims, 16 Drawing Sheets

(56) References Cited

U.S. PATENT DOCUMENTS

| | | | |
|---|---|---|---|
| 7,488,294 | B2 | 2/2009 | Torch |
| 7,515,054 | B2 | 4/2009 | Torch |
| 7,663,149 | B2 | 2/2010 | Seo et al. |
| 10,039,445 | B1 | 8/2018 | Torch |
| 10,706,600 | B1 * | 7/2020 | Yoon ................... G06F 3/011 |
| 11,394,014 | B2 | 7/2022 | Kubota et al. |
| 11,487,373 | B2 | 11/2022 | Kubota et al. |
| 2007/0273611 | A1 | 11/2007 | Torch |
| 2011/0077548 | A1 | 3/2011 | Torch |
| 2017/0177075 | A1 * | 6/2017 | Zhang ................ G02B 27/0172 |
| 2018/0068449 | A1 * | 3/2018 | Malaika ................. G06V 40/19 |
| 2020/0064592 | A1 * | 2/2020 | Tashiro .............. G02B 27/0075 |
| 2022/0173174 | A1 | 6/2022 | Hatsumi et al. |

FOREIGN PATENT DOCUMENTS

| | | |
|---|---|---|
| EP | 3490434 A | 6/2019 |
| JP | 2002-324673 A | 11/2002 |
| JP | 2002-362943 A | 12/2002 |
| JP | 2007-531579 | 11/2007 |
| JP | 2018-123093 A | 8/2018 |
| JP | 2019-531782 | 11/2019 |
| KR | 2019-0072519 A | 6/2019 |
| WO | WO-2005/094667 | 10/2005 |
| WO | WO-2017/105592 | 6/2017 |
| WO | WO-2018/048626 | 3/2018 |

OTHER PUBLICATIONS

Written Opinion (Application No. PCT/IB2022/053806) Dated Jul. 5, 2022.

* cited by examiner

PIX1

PIX2

PIX2

PIX3

ELECTRONIC DEVICE WITH DISPLAY APPARATUS HAVING LIGHT-EMITTING DEVICE AND LIGHT-RECEIVING DEVICE OVER INSULATING LAYER

CROSS REFERENCE TO RELATED APPLICATIONS

This application is a U.S. National Phase Application under 35 U.S.C. § 371 of International Application PCT/IB2022/053806, filed on Apr. 25, 2022, which is incorporated by reference and claims the benefit of a foreign priority application filed in Japan on May 7, 2021, as Application No. 2021-079056.

TECHNICAL FIELD

One embodiment of the present invention relates to an electronic device.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Accordingly, more specific examples of the technical field of one embodiment of the present invention disclosed in this specification include a semiconductor device, a display device, a liquid crystal display device, a light-emitting apparatus, a lighting device, a power storage device, a memory device, an image capturing device, an operation method thereof, and a manufacturing method thereof.

Note that in this specification and the like, a semiconductor device generally means a device that can function by utilizing semiconductor characteristics. A transistor and a semiconductor circuit are embodiments of semiconductor devices. In addition, in some cases, a memory device, a display apparatus, an imaging device, or an electronic device includes a semiconductor device.

BACKGROUND ART

In recent years, higher-resolution display panels have been required. Examples of devices that require high-resolution display panels include a smartphone, a tablet terminal, and a laptop computer. In addition, higher definition has been required for a stationary display device such as a television device or a monitor device with an increase in resolution. An example of a device required to have the highest resolution is a device for virtual reality (VR) or augmented reality (AR).

Examples of a display device that can be used for a display panel include, typically, a liquid crystal display device, a light-emitting apparatus including a light-emitting element such as an organic EL (Electro Luminescence) element or a light-emitting diode (LED), and electronic paper performing display by an electrophoretic method or the like.

For example, the basic structure of an organic EL element is a structure in which a layer containing a light-emitting organic compound is provided between a pair of electrodes. By applying voltage to this element, light emission can be obtained from the light-emitting organic compound. A display apparatus using such an organic EL element does not need a backlight that is necessary for a liquid crystal display device and the like; thus, a thin, lightweight, high-contrast, and low-power display device can be achieved. Patent Document 1, for example, discloses an example of a display device using an organic EL element.

REFERENCE

Patent Document

[Patent Document 1] Japanese Published Patent Application No. 2002-324673

SUMMARY OF THE INVENTION

Problems to be Solved by the Invention

As for devices for VR, for example, an electronic device where a display apparatus is incorporated in a housing with a goggle form has been commercialized. A goggle-type terminal is used by being worn on a user's head so that the user's eyes are covered with the goggle-type terminal, which causes a concern about an adverse effect on the user's eyes. Thus, it is preferable that an electronic device for VR or the like have a sensor function of sensing fatigue or anomaly from the user's body movements.

In view of the above, an object of one embodiment of the present invention is to provide an electronic device capable of detecting a user's body movement. Another object is to provide an electronic device capable of detecting a user's blinking action. Another object is to provide an electronic device capable of detecting a user's eyeball movement. Another object is to provide an electronic device capable of detecting a user's fatigue level. Another object is to provide an electronic device whose input operation corresponds to a user's blinking action. Another object is to provide a novel electronic device. Another object is to provide a novel semiconductor device or the like.

Note that the description of these objects does not preclude the existence of other objects. One embodiment of the present invention does not have to achieve all of these objects. Other objects will be apparent from and can be derived from the description of the specification, the drawings, the claims, and the like.

Means for Solving the Problems

One embodiment of the present invention relates to an electronic device where a display apparatus including a light-emitting device and a light-receiving device and a light source are provided inside a housing.

Another embodiment of the present invention is an electronic device including a display apparatus, a lens, a mirror, a light source, and an optical window, in which the display apparatus includes a light-emitting device and a light-receiving device; the lens is provided between the display apparatus and the optical window; the mirror is provided between the lens and the optical window so as to have a reflective surface on the optical window side; the light source is provided at a position overlapping with neither the display apparatus nor the optical window so that emitted light is incident obliquely on the reflective surface of the mirror; the emitted light reflected at the mirror is incident on a target object through the optical window; and light reflected by the target object enters the display apparatus through the optical window and the lens.

A light-transmitting plate may be provided between the lens and the optical window, and the mirror may be provided on a surface of the light-transmitting plate.

Alternatively, the mirror may be provided on a surface of the lens. Furthermore, a shortpass filter transmitting visible light and reflecting infrared light can be used as the mirror.

The light source preferably includes a laser emitting infrared light or a light-emitting diode emitting infrared light.

The optical window may be a lens.

The light-receiving device preferably includes a photoelectric conversion layer containing an organic compound. The light-receiving device preferably has a light-receiving sensitivity peak in the infrared light range. Furthermore, a filter blocking visible light is preferably provided at a portion overlapping with the light-receiving device. Furthermore, the light-receiving device can have components shared with the light-emitting device.

When the target object is a user's eyeball or eyelid, the blinking action or eyeball movement can be detected. With the detection of the blinking action or eyeball movement, the estimation of the fatigue level or the input operation of the electronic device can be performed.

With two electronic devices having the above-described structure provided in a housing, a goggle-type electronic device can be formed.

Effect of the Invention

According to one embodiment of the present invention, an electronic device capable of detecting a user's body movement can be provided. Alternatively, an electronic device capable of detecting a user's blinking action can be provided. Alternatively, an electronic device capable of detecting a user's eyeball movement can be provided. Alternatively, an electronic device capable of detecting a user's fatigue level can be provided. Alternatively, an electronic device whose input operation corresponds to a user's blinking action can be provided. Alternatively, a novel electronic device can be provided. Alternatively, a novel semiconductor device or the like can be provided.

Note that the description of these effects does not preclude the existence of other effects. One embodiment of the present invention does not necessarily have all of these effects. Other effects can be derived from the description of the specification, the drawings, and the claims.

MODE FOR CARRYING OUT THE INVENTION

Figure 1:
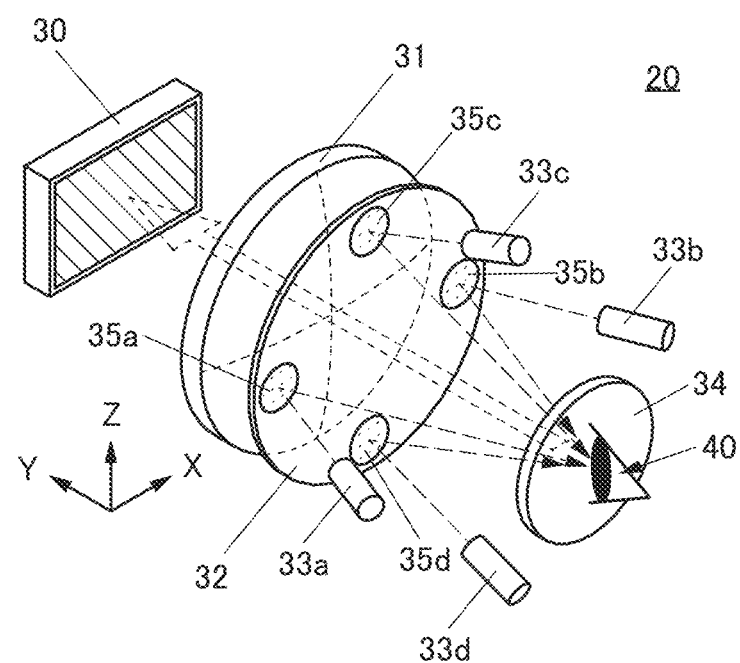
FIG. 1 is a diagram illustrating an electronic device.

Embodiments will be described in detail with reference to the drawings. Note that the present invention is not limited to the following description, and it will be readily understood by those skilled in the art that modes and details of the present invention can be modified in various ways without departing from the spirit and scope of the present invention. Therefore, the present invention should not be construed as being limited to the description of embodiments below. Note that in structures of the invention described below, the same reference numerals are used in common, in different drawings, for the same portions or portions having similar functions, and a repeated description thereof is omitted in some cases. Note that the hatching of the same component that constitutes a drawing is sometimes omitted or changed as appropriate in different drawings.

In addition, even in the case where a single component is illustrated in a circuit diagram, the component may be composed of a plurality of parts as long as there is no functional inconvenience. For example, in some cases, a plurality of transistors that operate as a switch are connected in series or in parallel. Furthermore, in some cases, capacitors are divided and arranged in a plurality of positions.

In addition, one conductor has a plurality of functions such as a wiring, an electrode, and a terminal in some cases. In this specification, a plurality of names are used for the same component in some cases. Even in the case where components are illustrated in a circuit diagram as if they were directly connected to each other, the components may actually be connected to each other through one or more conductors; in this specification, even such a structure is included in direct connection.

Embodiment 1

In this embodiment, electronic devices of one embodiment of the present invention will be described.

One embodiment of the present invention is an electronic device that is display equipment worn in front of a user's eye and capable of detecting the user's blinking action. The electronic device includes a display apparatus and a light source in a housing. The display apparatus includes a light-emitting device (also referred to as a light-emitting element) and a light-receiving device (also referred to as a light-receiving element) in a display portion.

Light emitted by the light source is incident on and reflected by the user's eye or the vicinity thereof through a mirror, and the reflected light is detected by the light-receiving device. The amount of light reflected by the eyelid and that by the eyeball are different from each other, which makes it possible to detect the blinking action.

The blinking action has a high correlation with the eye fatigue. Thus, the number or interval of/between blinks per unit time is detected or the rate of opening and closing the eyelid or the like is detected, whereby the user's fatigue state can be estimated. Furthermore, the conscious action of opening and closing the eyelid can correspond to the operation of an input to the electronic device.

Figure 2A:
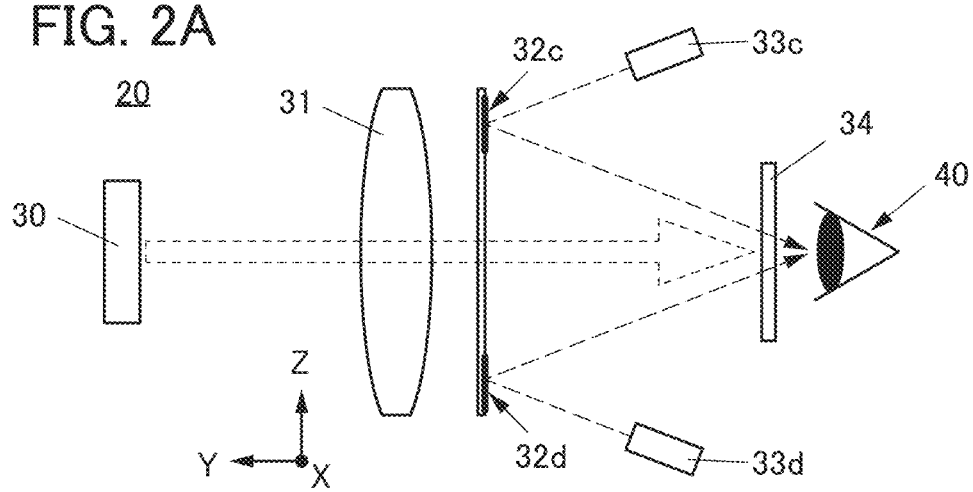
FIG. 2A to FIG. 2D are diagrams illustrating an electronic device.
Figure 2B:
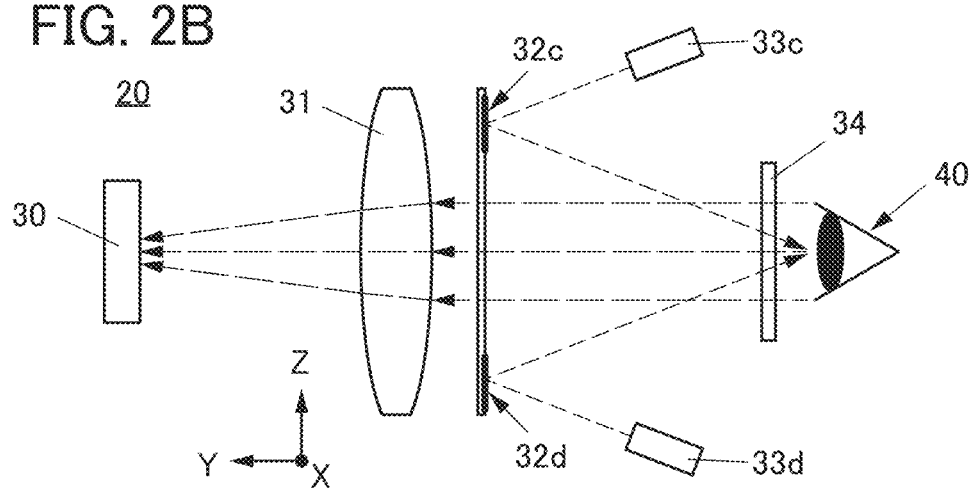
Figure 2C:
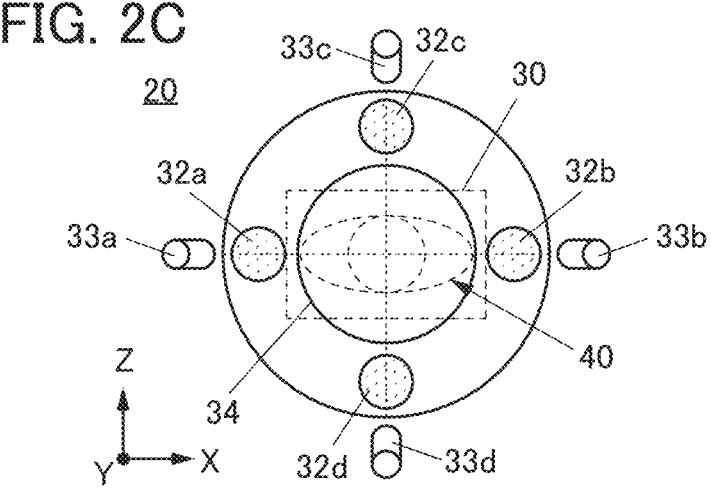

FIG. 1 is a perspective view illustrating an electronic device of one embodiment of the present invention. An electronic device 20 includes a display apparatus 30, a lens 31, a light-transmitting plate 32, a lighting source 33 (light sources 33a, 33b, 33c, and 33d), and an optical window 34. On a surface of the light-transmitting plate 32, a mirror 35 (mirrors 35a, 35b, 35c, and 35d) are provided. FIG. 2A and FIG. 2B are diagrams of the electronic device 20 seen in the X-direction. FIG. 2C is a diagram of the electronic device 20 seen in the Y-direction. In FIG. 2A to FIG. 2C, some components are omitted or denoted by dashed lines for simplicity.

The user can see an image displayed on the display apparatus 30 through the lens 31, the light-transmitting plate 32, and the optical window 34, making an eye 40 approach the vicinity of the optical window 34 (see FIG. 2A). A variety of images such as a movie or VR videos can be displayed on the display apparatus 30, and the user recognizes the image mainly visually, thereby capable of obtaining the sense of immersion or realistic sensation.

The eye 40 of the user or the vicinity thereof that is considered as a target object is irradiated with light emitted by the light source 33 through the mirror 35 and the optical window 34. Then, the light reflected by the target object (reflected light) is incident on the display apparatus 30 through the optical window 34, the light-transmitting plate 32, and the lens 31 (see FIG. 2B). The eye 40 of the user or the vicinity thereof has a shape close to a spherical surface; accordingly, light that is even incident obliquely on the target object can be reflected efficiently in the direction toward the display apparatus 30. The display apparatus 30 includes a light-receiving device, which enables the reflected light to be detected.

Since the reflectance of light, which has been emitted by the light source 33, at the surface of the eyeball and that at the eyelid (skin) are different from each other, detecting the reflect light enables the blinking action to be detected. Although FIG. 1 and the like show an example of providing a plurality of pairs of the mirror 35 and the light source 33, the number of pairs of the mirror 35 and the light source 33 may be one or more. When a plurality of pairs of the mirror 35 and the light source 33 are provided, the amount of reflected light detected by the display apparatus 30 is increased, whereby the SN ratio can be increased.

The display apparatus 30 includes a display device and a light-receiving device. The display device is preferably a light-emitting device such as an organic EL element emitting visible light. The light-receiving device preferably has a light-receiving sensitivity peak in the infrared light range and includes a photoelectric conversion layer formed using an organic compound. With such a structure, the display device and the light-receiving device can have components common to each other; the device structure and the manufacturing process can be simplified. A detailed structure of the display apparatus 30 is described later.

The lens 31 is formed using a material that transmits visible light and infrared light and has a function of forming an image that is an image displayed on a display surface of the display apparatus 30 on a retina inside the eye 40. Although one convex lens is exemplified as the lens 31 in FIG. 1 and the like, the lens 31 may be formed of a plurality of lenses. Furthermore, a combination of a convex lens and a concave lens may be used. A mirror may be provided between the display apparatus 30 and the lens 31 or between the lenses.

When the positions of the lens 31 and the display apparatus 30 are fixed, an image is not formed on the eyelid and the surface of the eyeball; meanwhile, the light-receiving device in the display apparatus can detect a change in the amount of light sufficiently. Like the light-emitting devices, the light-receiving devices are widely arranged in a matrix in the display apparatus 30, which enables diffusing reflected light to be detected with high sensitivity.

The transmittance of visible light and infrared light (the wavelength of light emitted by the light source 33) through the lens 31 is preferably higher than or equal to 80% and lower than 100%, further preferably higher than or equal to 90% and lower than 100%.

The light-transmitting plate 32 is formed using a material transmitting visible light and infrared light and provided with the mirror 35 (mirrors 35a, 35b, 35c, and 35d) in regions near its end portions. The mirror 35 preferably transmits visible light and reflects infrared light. The mirror transmitting visible light and reflecting infrared light is also called a shortpass filter or a hot mirror and, for example, can have a reflective surface formed using a dielectric multilayer film provided on a surface of the light-transmitting plate 32.

Since the light-transmitting plate 32 and the mirror 35 can transmit visible light, they can transmit light of a displayed image even within the field of view. Thus, a degradation of display quality can be inhibited.

Figure 3A:
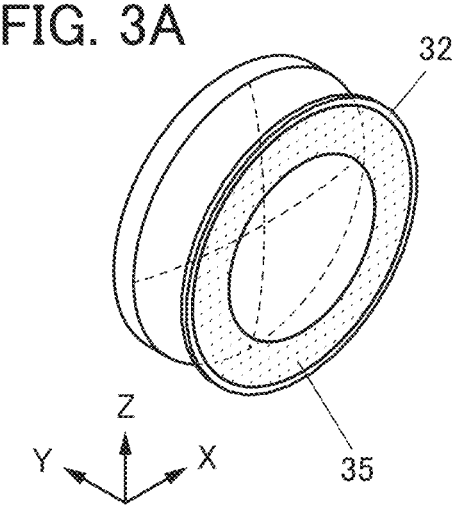
FIG. 3A and FIG. 3B are diagrams illustrating a mirror.
Figure 3B:
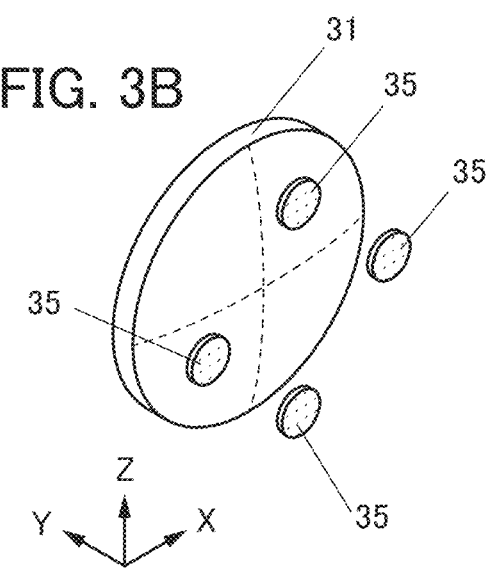

Note that the mirror 35 may be provided in a ring-like shape or the like on the surface of the light-transmitting plate 32, as illustrated in FIG. 3A. When the mirror 35 is out of the field of view, a plurality of mirrors 35 may be provided independently, as illustrated in FIG. 3B. Even when the mirror 35 is within the field of view, the refractive index of a base of the mirror 35, the reflectance of the surface of the mirror 35, or the like is controlled as appropriate so as not to be an obstacle to displaying images, in which case the mirror 35 can have a shape illustrated in FIG. 3B.

The transmittance of visible light and infrared light (the wavelength emitted by the light source 33) through the light-transmitting plate 32 is preferably higher than or equal to 80% and lower than 100%, further preferably higher than or equal to 90% and lower than 100%. The transmittance of visible light through the mirror 35 is preferably higher than or equal to 80% and lower than 100%, further preferably higher than or equal to 90% and lower than 100%. The reflectance of infrared light (the wavelength emitted by the light source 33) through the mirror 35 is preferably higher than or equal to 80% and lower than 100%, further preferably higher than or equal to 90% and lower than 100%.

The light source 33 preferably includes a laser or light-emitting diode that emits infrared light. Since the visibility of infrared light is extremely low, the infrared light is less likely to affect visual recognition of displayed images. Furthermore, it is preferable to irradiate a position of the eyelid efficiently with light when the eyes are closed, for detecting the blinks; it is preferable to use light with directivity. Therefore, when a light-emitting diode is used, a combination with condensing light is preferable.

Usable infrared light ranges from near-infrared light to far-infrared light; however, a heat source or the like for far-infrared light causes noise and it is thus preferable to use light with a peak in near-infrared light range (wavelength: 720 nm to 2500 nm). As a semiconductor that is used for a laser emitting near-infrared light or a light-emitting layer of a light-emitting diode, GaAs, GaAlAs, InGaAs, or the like can be used, for example.

Figure 3C:
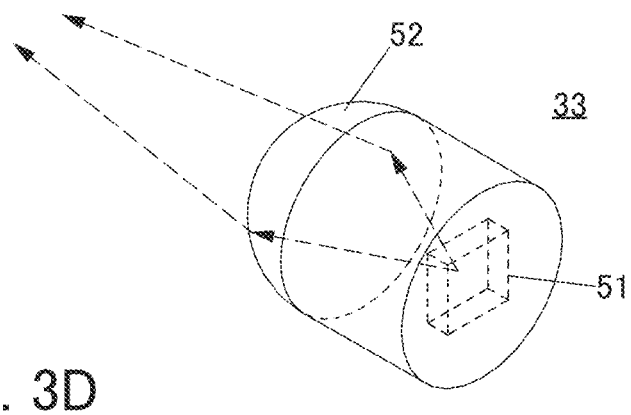
FIG. 3C and FIG. 3D are diagrams illustrating a light source.

FIG. 3C shows an example of the light source 33 with a structure where a light-emitting diode 51 and a lens 52 are combined, for example. A structure of the light-emitting diode 51 is such that part thereof is embedded in a resin in a lens form so that light emitted by the light-emitting diode 51 is focused on the lens 52, thereby being capable of inhibiting light diffusion. The light-emitting diode with such a structure is sometimes called a lamp-type light-emitting diode.

Figure 3D:
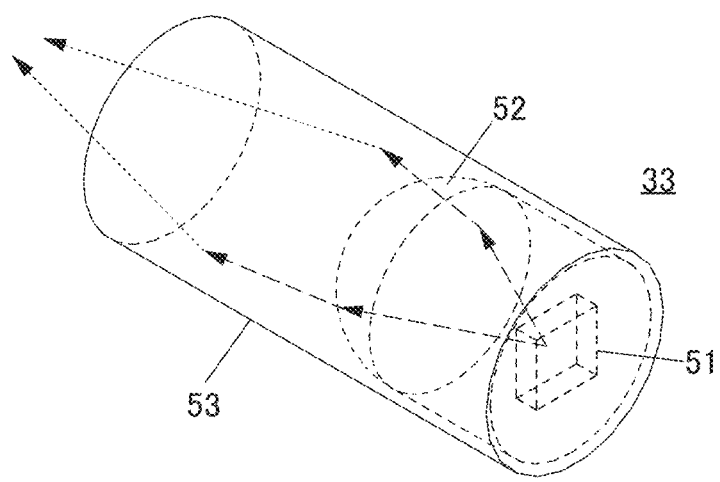

Furthermore, as in FIG. 3D, the light source 33 may have a structure provided with a cylindrical light-blocking wall 53 that covers the structure shown in FIG. 3C. Part of light emitted by the light-emitting diode 51 is delivered in an oblique direction. Reflection and attenuation of the light becomes possible with the light-blocking wall 53, whereby light diffusion can be inhibited. Moreover, a lens may be further provided in the cylindrical light-blocking wall 53. Note that the shape of the light-blocking wall 53 is not limited to a cylindrical shape, and a cross section perpendicular to the long axis may have a polygonal or oval shape. A material reflecting or absorbing infrared light may be provided inside the light-blocking wall 53.

The mirror 35 (mirrors 35a, 35b, 35c, and 35d) can be located at positions overlapping with the lens 31. The main function of the mirror 35 is to reflect light emitted by the light source 33 in the direction toward the optical window 34.

Figure 4A:
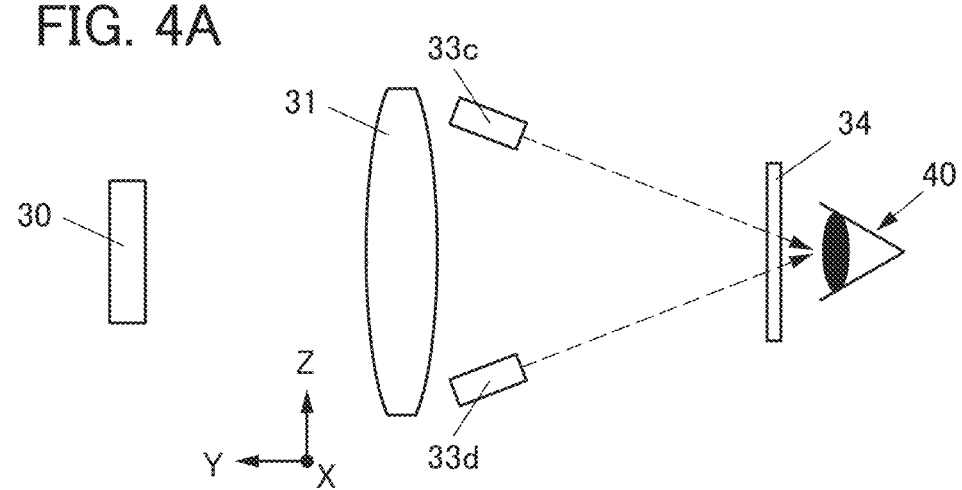
FIG. 4A to FIG. 4C are diagrams each illustrating an electronic device.

As illustrated in FIG. 4A, the mirror 35 is not provided, and the optical window 34 is irradiated directly with light emitted by the light source 33, in also which case reflect light can be obtained from the eye 40 or the vicinity thereof. However, part of a displayed image is blocked by the light source 33, which significantly degrades display quality. Even when the visible light source 33 does not hinder the displayed image, the sense of immersion is reduced as long as the light source 33 is within the field of view.

Figure 4B:
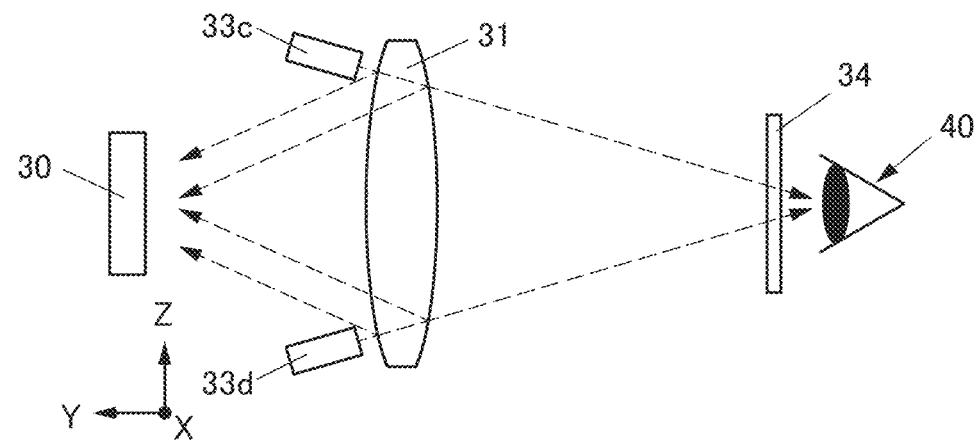

As illustrated in FIG. 4B, locating the light source 33 between the display apparatus 30 and the lens 31 makes it easy to remove the light source 33 from the field of view; however, the light reflected at the surface of the lens 31 enters the display apparatus 30. Accordingly, noise components in detecting infrared light by the light-receiving device are increased.

Figure 4C:
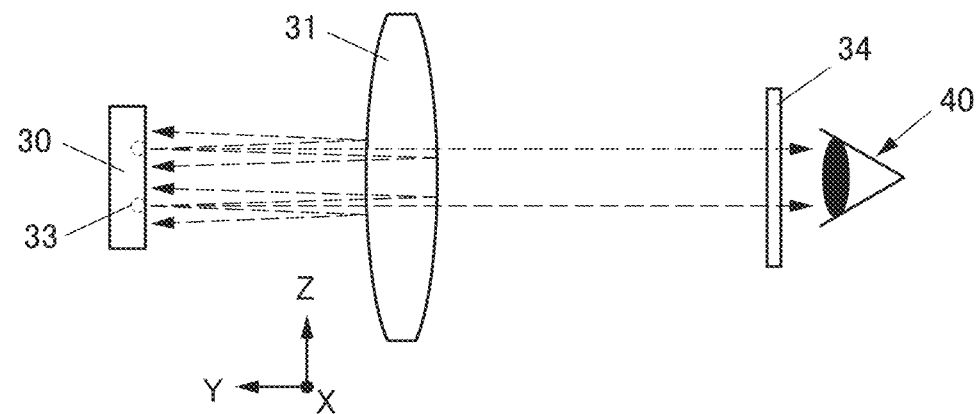

As illustrated in FIG. 4C, a structure where light is emitted by the light source 33 provided in the display apparatus 30 and reflected light is detected can be employed; however, as in the case of FIG. 4B, noise components are increased due to light reflected at the surface of the lens 31.

Although not illustrated, the light source 33 is provided so that the incident angle of light with respect to the eye 40 is large in the structure of FIG. 4A or FIG. 4B, the light source 33 can be easily removed from the field of view. However, the reflection angle is also increased, which causes a reduction in the amount of reflected light entering the display apparatus 30. Therefore, light of the light source 33 is preferably delivered toward the optical window 34 through the mirror 35 as illustrated in FIG. 2A and FIG. 2B.

Figure 2D:
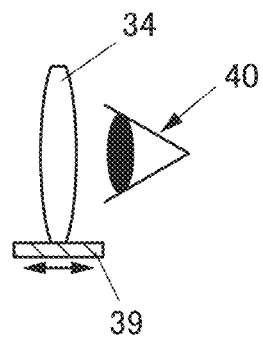

The optical window 34 corresponds to a window provided in an optical aperture in a housing of an electronic device and can be formed using a material transmitting visible light and infrared light. When the eye 40 approaches the vicinity of the optical window 34, the effects of the components (such as the display apparatus 30, the lens 31, the light-transmitting plate 32, and the light source 33) provided in the housing of the electronic device 20 can be obtained. Note that the optical window 34 may be a lens and have a function of adjusting a focus with the lens 31. For example, as illustrated in FIG. 2D, a slide mechanism 39 is provided for the optical window 34 (lens) to make a structure where the distance between the lens 31 and the optical window 34 (lens) can be changed, whereby the eyesight adjustment can be performed. The structure illustrated in FIG. 2D can be used for another electronic device described in this specification.

The transmittance of visible light and infrared light (the wavelength emitted by the light source 33) through the optical window 34 is preferably higher than or equal to 80% and lower than 100%, further preferably higher than or equal to 90% and lower than 100%.

Figure 5A:
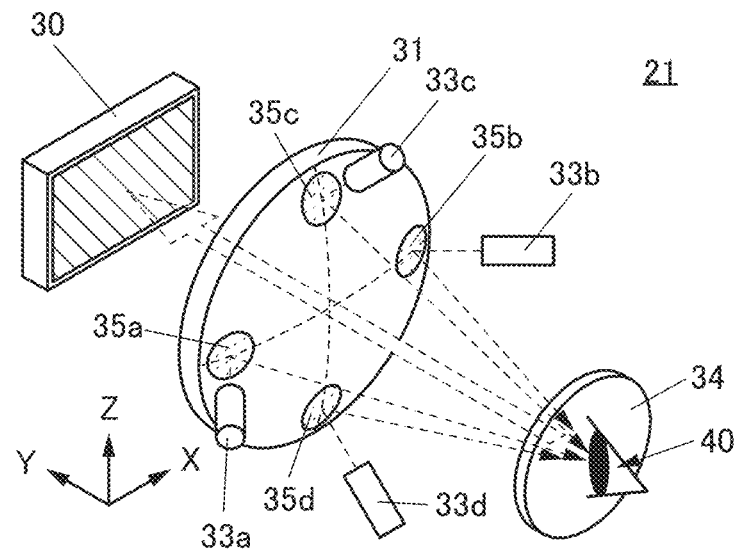
FIG. 5A is a diagram illustrating an electronic device.
Figure 6A:
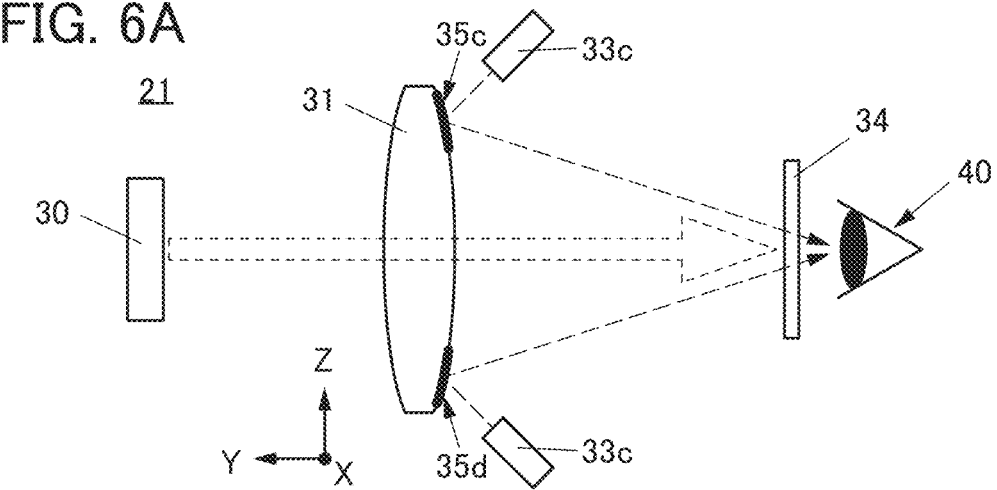
FIG. 6A to FIG. 6C are diagrams illustrating an electronic device.
Figure 6B:
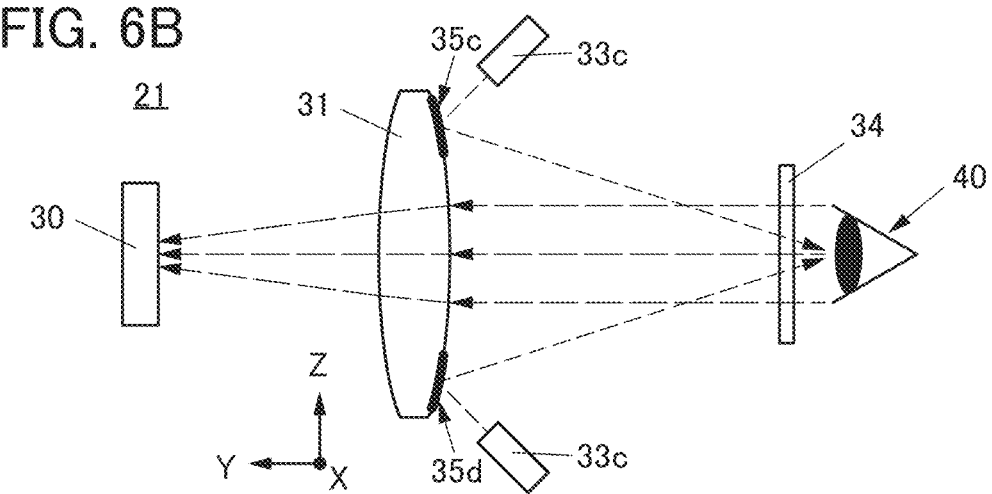
Figure 6C:
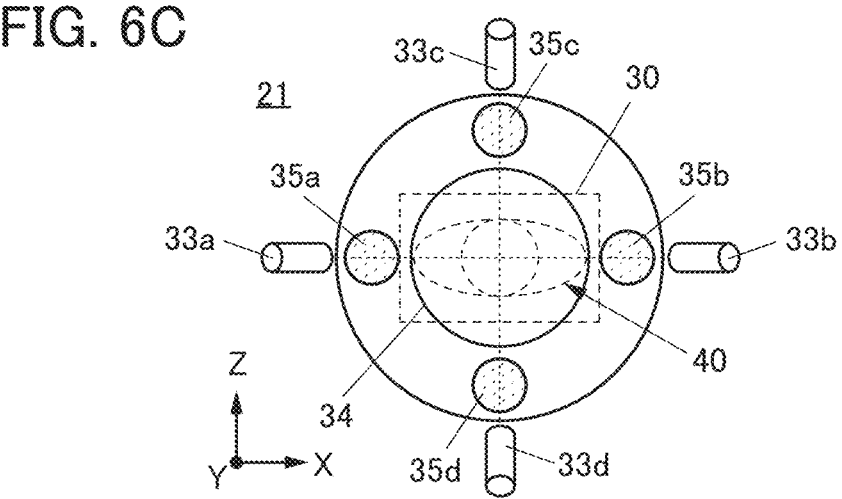

An electronic device of one embodiment of the present invention may have a structure illustrated in FIG. 5A. An electronic device 21 illustrated in FIG. 5A is different from the electronic device 20 illustrated in FIG. 1 in that the mirror 35 (mirrors 35a, 35b, 35c, and 35d) is provided on a surface of the lens 31. FIG. 6A and FIG. 6B are diagrams of the electronic device 21 seen in the X-direction. FIG. 6C is a diagram of the electronic device 21 seen in the Y-direction. In FIG. 6A to FIG. 6C, some components are omitted or denoted by dashed lines for simplicity.

When the mirror 35 is provided on the surface of the lens 31, the light-transmitting plate 32 is not necessary. Thus, the occurrence of light reflection and attenuation due to the light-transmitting plate 32 can be prevented, and the visibility of displayed images and light-receiving sensitivity of the light-receiving device can be improved.

Figure 5B:
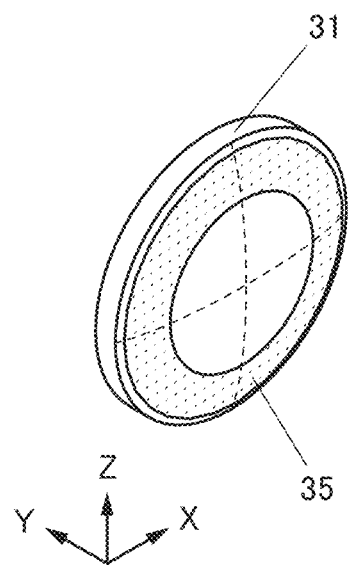
FIG. 5B illustrates a mirror.

For example, the mirror 35 can be formed using a dielectric multilayer film provided on the surface of the lens 31. Note that the mirror 35 may be provided in a ring-like shape or the like on the surface of the lens 31, as illustrated in FIG. 5B.

Figure 7A:
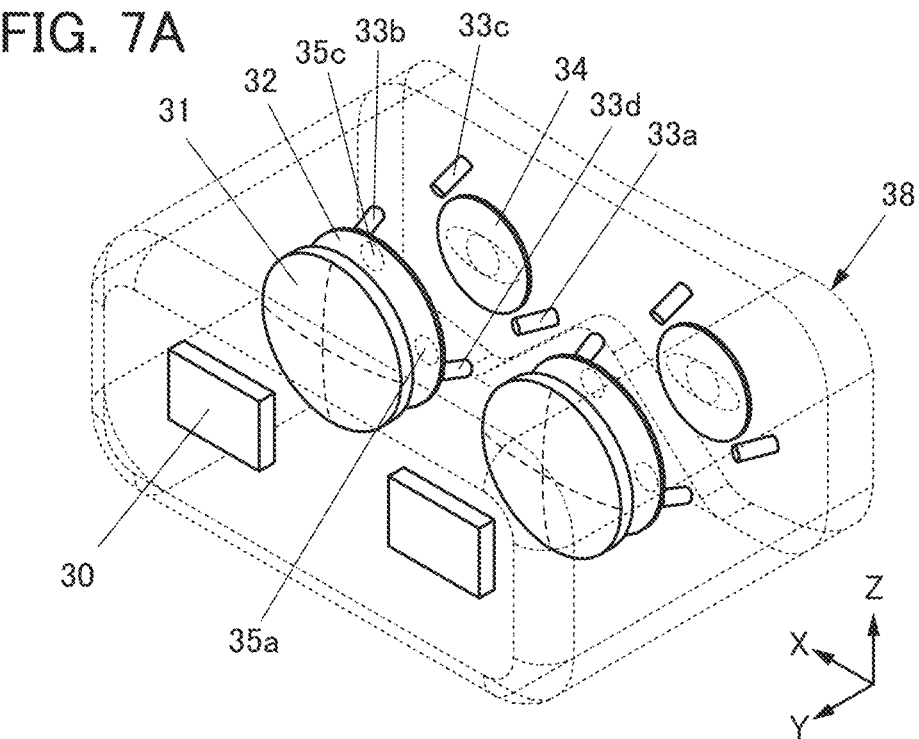
FIG. 7A and FIG. 7B are diagrams each illustrating a goggle-type electronic device.
Figure 7B:
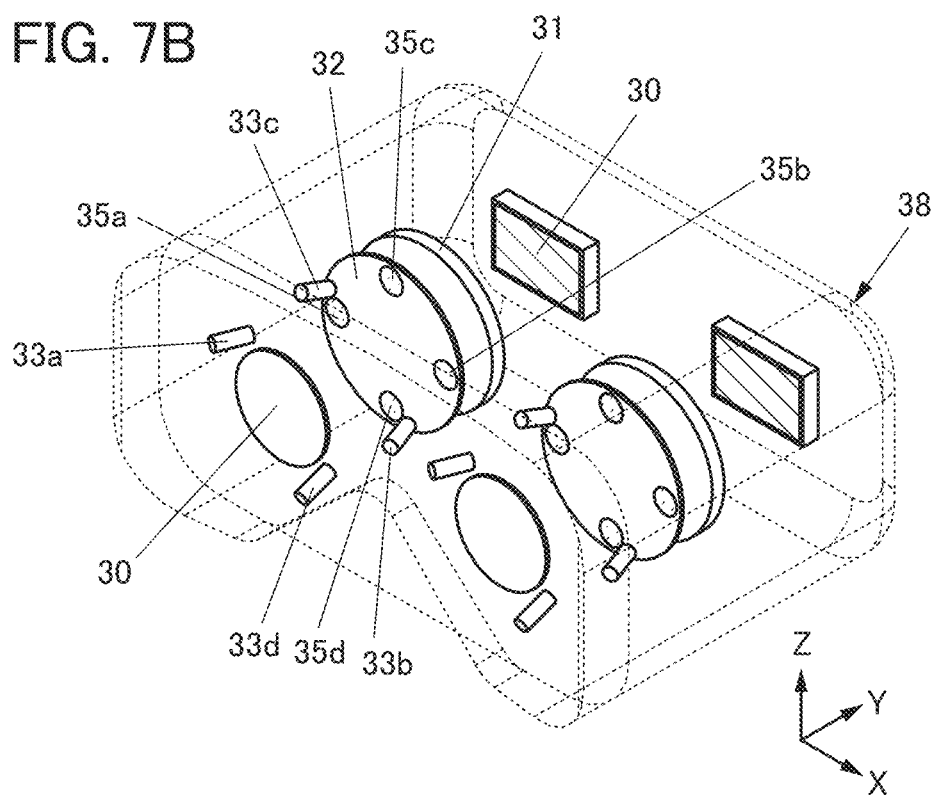

FIG. 7A and FIG. 7B illustrate a goggle-type electronic device in which two electronic devices 20 shown in FIG. 1 are incorporated. Note that a band or the like used for wearing the electronic device on a user's head is not illustrated.

The two electronic devices 20 are arranged in a housing 38 denoted by a dashed line so that the optical window 34 corresponds to a window. One of the electronic device 20 is for the right eye, and the other electronic device 20 is for the left eye. The electronic devices 20 display images for the respective eyes, whereby the stereoscopic effect of images can be obtained. The electronic device 21 shown in FIG. 5 may be used for the goggle-type electronic device.

With use of two electronic devices 20, blinks of both eyes can be detected. Infrared light emitted by the light source 33 is incident on the eyes or the vicinity thereof through the mirror 35, and reflected light of the incident light is detected by the light-receiving device in the display apparatus 30. The amount of light reflected by the eyelid and that by the eyeball are different from each other; accordingly, the blinking action can be detected.

In general, the blinks are concurrently performed with the both eyes. With the two electronic devices 20, the detection sensitivity of blinks can be increased.

Figure 8:
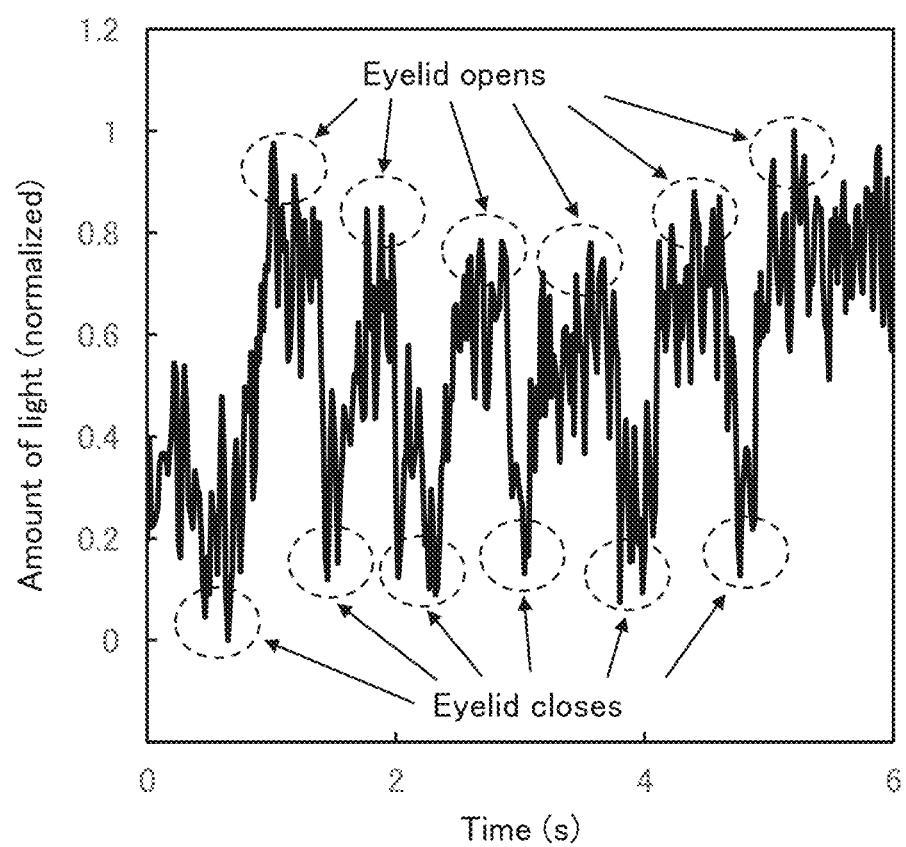
FIG. 8 shows detection results of blinking action.

FIG. 8 shows results of detecting the blinking action using the display apparatus 30 and the light source 33 that are components of the electronic device 20. The results are obtained in the following manner. One eye of a user is irradiated with infrared light (a wavelength of 850 nm) from the light source 33, and the amount of reflected light in blinking an eye a few times in several seconds is measured by the light-receiving device in the display apparatus 30.

According to FIG. 8, the amounts of detected light are significantly different between times when the eyelid opens (reflection at the surface of the eyeball) and when the eyelid closes (reflection at the eyelid), which shows that the blinking action can be detected. The results are measurement results of one eye. When results of both eyes are obtained using two electronic devices 20, data with further reduced noise can be obtained.

The blinking action has a high correlation with the eye fatigue. Thus, the number or interval of/between blinks per unit time is detected or the rate of opening and closing the eyelid and the like is detected, whereby the fatigue state can be estimated.

When the blinking action suggesting the progress of fatigue is detected, the electronic device performs operations of creating display or sounds for recommending taking a rest, lowering the brightness of the display, lowering a color temperature of the display, or the like, thereby being capable of taking action for the user's fatigue.

When the recommendation of taking a rest is notified with display or sounds, a user might feel uncomfortable as the action, recreation, or sense of immersion is hindered against the user's will. Thus, in the recommendation of taking a rest, an apparatus generating a sound, vibration, or odor is activated to induce the user to feel as if he/she would like to take a rest.

Although the above shows the example of detecting the user's fatigue with the blinking action, the fatigue or disease may be detected by obtaining another type of data. For example, a change in a tear film is detected by comparing the amount of light reflected by the surface of the eyeball to that in a normal time, to suppress the dry eyes or take care of the dry eye symptoms. The opening degree of the eye (the lifting degree of the eyelid) may be detected by the amount of reflected light and compared with that in the normal time, whereby the fatigue degree is estimated.

The conscious action of opening and closing the eyelid can be an operation of input to the electronic device. For example, any of actions of blinking only with one eye, blinking determined times during a certain time of period, closing the eyelids for a certain time or longer, and the like can be assigned to the operation of the electronic device.

The reflectance at the eyeball and that at the sclera are different, which allows the eyeball movement to function as an input operation to the electronic device. For example, a change in reflectance caused by actions of pulling the eyeball over to one of left and right sides or one of the upper and lower sides, and the like is detected, which may be assigned to the operation of the electronic device.

For example, operations such as power-on, power-off, going into sleep mode, volume control, switching the channel, displaying a menu, selection, entry, and return, operations of playing, stopping, pausing, fast-forwarding and fast-rewinding of videos, and the like can be assigned to the actions of opening and closing the eyelid and eyeball movement.

Figure 9A:
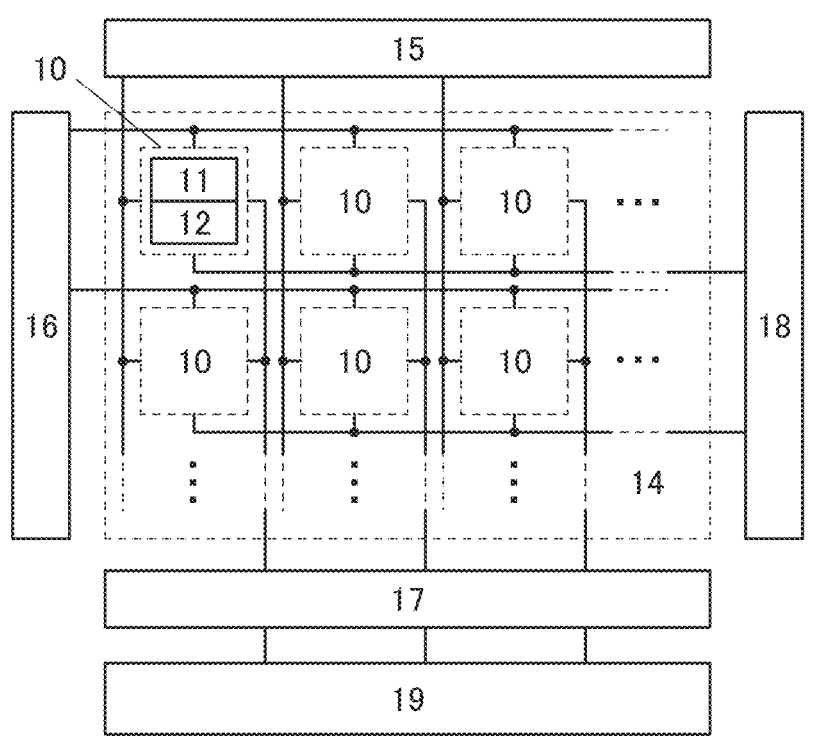
FIG. 9A and FIG. 9B are diagrams illustrating a display apparatus.

FIG. 9A is a diagram illustrating the display apparatus 30 included in an electronic device of one embodiment of the present invention. The display apparatus 30 includes a pixel array 14, a circuit 15, a circuit 16, a circuit 17, a circuit 18, and a circuit 19. The pixel array 14 includes pixels 10 arranged in a column direction and a row direction.

The pixel 10 can include subpixels 11 and 12. For example, the subpixel 11 has a function of emitting light for display. The subpixel 12 has a function of detecting light incident on the display apparatus 30.

Note that in this specification, although a minimum unit in which independent operation is performed in one "pixel" is defined as a "subpixel" in the description for convenience, a "pixel" may be replaced with a "region" and a "subpixel" may be replaced with a "pixel".

The subpixel 11 includes a light-emitting device that emits visible light. As the light-emitting device, an EL element such as an OLED (Organic Light Emitting Diode) or a QLED (Quantum-dot Light Emitting Diode) is preferably used. Examples of a light-emitting substance included in the EL element include a substance emitting fluorescent light (a fluorescent material), a substance emitting phosphorescent light (a phosphorescent material), a substance exhibiting thermally activated delayed fluorescence (a thermally activated delayed fluorescent (TADF) material), and an inorganic compound (e.g., a quantum dot material). In addition, an LED (Light Emitting Diode) such as a micro-LED can also be used as the light-emitting device.

The subpixel 12 includes a light-receiving device that has sensitivity to infrared light. Near-infrared light can be used as infrared light, for example. A photoelectric conversion element that detects incident light and generates electric charge can be used as the light-receiving device. The amount of electric charge generated in the light-receiving device is determined depending on the amount of incident light. For example, a pn or pin photodiode can be used as the light-receiving device.

It is preferable to use an organic photodiode including an organic compound in a photoelectric conversion layer as the light-receiving device. An organic photodiode is easily made thin and lightweight and easily has a large area. In addition, an organic photodiode can be applied to a variety of display apparatuses because of its high flexibility in shape and design. Alternatively, a photodiode including crystalline silicon (e.g., single crystal silicon, polycrystalline silicon, or microcrystalline silicon) can be used as the light-receiving device.

In one embodiment of the present invention, an organic EL element is used as the light-emitting device, and an organic photodiode is used as the light-receiving device. Some components of the organic photodiode can be shared with the organic EL element. Accordingly, the light-receiving device can be incorporated in the display apparatus 30 without a significant increase in the number of manufacturing steps. For example, the photoelectric conversion layer of the light-receiving device and the light-emitting layer of the light-emitting device may be separately formed, and the other layers may have the same structure for the light-emitting device and the light-receiving device.

The circuit 15 and the circuit 16 are driver circuits for driving the subpixel 11. The circuit 15 can have a function of a source driver and the circuit 16 can have a function of a gate driver. A shift register circuit or the like can be used as the circuit 15 and the circuit 16, for example. Note that the driver circuits for the subpixels 11 and 12 may be separated.

The circuit 17 and the circuit 18 are driver circuits for driving the subpixel 12. The circuit 17 can have a function of a column driver and the circuit 18 can have a function of a row driver. A shift register circuit, a decoder circuit, or the like can be used as the circuit 17 and the circuit 18, for example.

The circuit 19 is a read circuit for data output from the subpixel 12. The circuit 19 includes, for example, an A/D converter circuit and has a function of converting analog data output from the subpixel 12 into digital data. In addition, the circuit 19 may include a CDS circuit that performs correlated double sampling processing on output data.

Figure 9B:
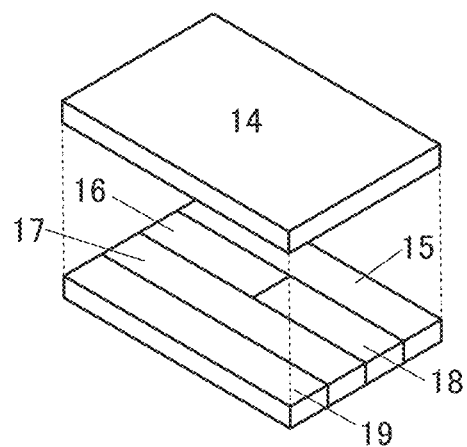

As illustrated in FIG. 9B, a structure where the circuit 15 to the circuit 19 overlap with the pixel array 14 may be employed. This structure enables a display apparatus with a narrow bezel to be formed. The driver circuits are below the pixel array 14, which enables reductions in the wiring lengths, wiring capacitance, and the like. Accordingly, a display apparatus capable of high-speed operation with low power consumption can be provided. The layouts and areas of the circuit 15 to the circuit 19 illustrated in FIG. 9B are examples, and can be changed as appropriate. Some parts of the circuit 15 to the circuit 19 can be provided in the same layer as the pixel array 14.

To obtain the above structure, for example, the circuit 15 to the circuit 19 can be formed using transistors formed on a single crystal silicon substrate or the like (hereinafter, Si transistors), and a pixel circuit in the pixel array 14 can be formed using transistors each including a metal oxide in a channel formation region (hereinafter, OS transistors). An OS transistor can be formed with thin films and can be stacked over a Si transistor.

The subpixel 12 can have a function of an input interface. The subpixel 12 can receive infrared light emitted from the outside of the display apparatus 30. Thus, the amount of infrared light detected by the subpixel 12 is analyzed, whereby the blinking action can be detected, for example.

Image capturing data on an iris or the like can be obtained with use of the light-receiving device. That is, a biological authentication function can be added to the display apparatus. In order to form an image of an iris on the light-receiving device, a structure in which the distance between the eyes and the lens 31 or the display apparatus 30 is changeable is used. For example, a structure in FIG. 2D can be used.

In addition, image capturing data on eye movement, change of the pupil diameter, or the like can be obtained with use of the light-receiving device. By analysis of the image data, information on the user's physical and mental state can be obtained. On the basis of the information, it is possible to perform operation in accordance with the user's physical and mental state, e.g., to change one or both of display and sound output by the display apparatus. Such operation is effective for devices for VR (Virtual Reality), devices for AR (Augmented Reality), or devices for MR (Mixed Reality).

Figure 9C:
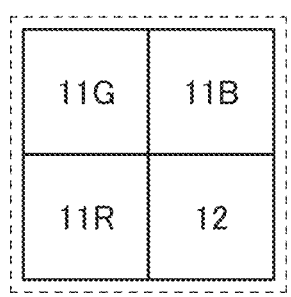
FIG. 9C to FIG. 9E are diagrams illustrating pixels.
Figure 9D:
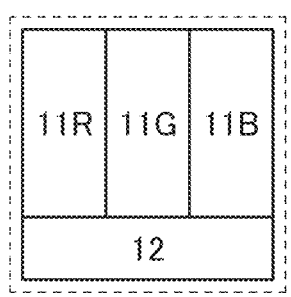
Figure 9E:
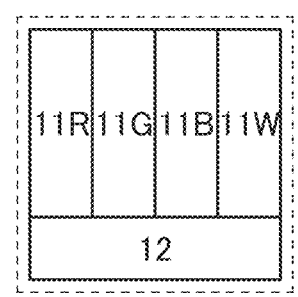

FIG. 9C to FIG. 9E are diagrams illustrating examples of the layout of the subpixels in the pixel 10. FIG. 9A illustrates the example in which one subpixel 11 and one subpixel 12 are placed in the pixel 10; however, as illustrated in FIG. 9C, a subpixel 11R including a light-emitting device that emits a red color, a subpixel 11G including a light-emitting device that emits a green color, and a subpixel 11B including a light-emitting device that emits a blue color may be placed in the pixel 10. Color display can be performed with this structure.

Note that FIG. 9C illustrates the layout in which the subpixel 11R, the subpixel 11G, the subpixel 11B, and the subpixel 12 are arranged vertically and horizontally; however, layout illustrated in FIG. 9D may be employed.

Furthermore, a subpixel 11W that includes a white-light-emitting device may be provided as shown in FIG. 9E. Since the subpixel 11W can emit white light by itself, the emission luminance of the other colors can be reduced in the case of display of white or a color close to white. Therefore, display can be performed with lower power.

Note that the positions of the subpixels illustrated in FIG. 9C to FIG. 9E may be interchanged. Note that the structures of the pixels and the subpixels are not limited to the above, and any of a variety of arrangement modes can be employed.

At least part of this embodiment can be implemented in combination with the other embodiments described in this specification as appropriate.

Embodiment 2

In this embodiment, a light-emitting apparatus that can be used as the display apparatus 30 and a structure example thereof will be described.

In this specification and the like, a device formed using a metal mask or an FMM (fine metal mask, high-resolution metal mask) may be referred to as a device having an MM (metal mask) structure. In this specification and the like, a device formed without using a metal mask or an FMM may be referred to as a device having a metal maskless (MML) structure.

Note that in this specification and the like, a structure in which light-emitting layers in light-emitting devices of respective colors (here, blue (B), green (G), and red (R)) are separately formed or the light-emitting layers are separately patterned is sometimes referred to as an SBS (Side By Side) structure. In this specification and the like, a light-emitting device capable of emitting white light may be referred to as a white-light-emitting device. Note that a combination of a white light-emitting device with a coloring layer (e.g., a color filter) enables a full-color display device.

Light-emitting devices can be classified roughly into a single structure and a tandem structure. A device having a single structure includes one light-emitting unit between a pair of electrodes, and the light-emitting unit preferably includes one or more light-emitting layers. To obtain white light emission, two or more of light-emitting layers are selected such that their emission colors are complementary to each other. For example, when the emission color of a first light-emitting layer and the emission color of a second light-emitting layer are complementary colors, the light-emitting device can be configured to emit white light as a whole. The same applies to a light-emitting device including three or more light-emitting layers.

A device having a tandem structure includes two or more light-emitting units between a pair of electrodes, and each light-emitting unit preferably includes one or more light-emitting layers. To obtain white light emission, the structure is made so that light from light-emitting layers of the plurality of light-emitting units can be combined to be white light. Note that a structure for obtaining white light emission is similar to that in the case of a single structure. In the device having a tandem structure, an intermediate layer such as a charge-generation layer is suitably provided between the plurality of light-emitting units.

When the above white-light-emitting device (having a single structure or a tandem structure) and the above light-emitting device having an SBS structure are compared to each other, the light-emitting device having an SBS structure can have lower power consumption than the white-light-emitting device. To reduce power consumption, a light-emitting device having an SBS structure is preferably used. Meanwhile, the white-light-emitting device is preferable in terms of lower manufacturing cost or higher manufacturing yield because the manufacturing process of the white-light-emitting device is simpler than that of a light-emitting device having an SBS structure.

The device with a tandem structure may include light-emitting layers emitting light of the same color (e.g., BB, GG, or RR). The tandem structure emitting light from a plurality of layers requires high voltage for light emission but achieves the same emission intensity as a single structure with a smaller current value. Thus, with the tandem structure, current stress on each light-emitting unit can be reduced and the element lifetime can be extended.

The display apparatus 30 includes a light-emitting device and a light-receiving device. For example, when three kinds of light-emitting devices emitting light of red (R), green (G), and blue (B) are included, a full-color display apparatus can be achieved.

In one embodiment of the present invention, an EL layer (an organic layer contributing to light emission of the light-emitting device) and an active layer (an organic layer contributing to photoelectric conversion of the light-receiving device) are processed into fine patterns by a photolithography method without using a shadow mask such as a metal mask. This allows a display apparatus with high resolution and a high aperture ratio, which has been difficult to achieve, to be obtained. Moreover, EL layers can be formed separately, enabling the display apparatus to perform extremely clear display with high contrast and high display quality.

It is difficult to set the distance between EL layers for different colors or between an EL layer and an active layer to be less than 10 µm with a formation method using a metal mask, for example. In contrast, with use of the above method, the distance can be decreased to be less than or equal to 3 µm, less than or equal to 2 µm, or less than or equal to 1 µm. For example, with use of an exposure apparatus for LSI, the distance can be decreased to less than or equal to 500 nm, less than or equal to 200 nm, less than or equal to 100 nm, or less than or equal to 50 nm. This can significantly reduce the area of a non-light-emitting region that may exist between two light-emitting devices or between a light-emitting device and a light-receiving device, so that the aperture ratio can be close to 100%. For example, the aperture ratio higher than or equal to 50%, higher than or equal to 60%, higher than or equal to 70%, higher than or equal to 80%, or higher than or equal to 90% and lower than 100% can be achieved.

Furthermore, patterns of the EL layer and the active layer themselves can be made extremely smaller than those in the case of using a metal mask. For example, in the case of using a metal mask for forming EL layers separately, a variation in the thickness of the pattern occurs between the center and the edge of the pattern, which causes a reduction in an effective area that can be used as a light-emitting region with respect to the entire pattern area. By contrast, in the above manufacturing method, a pattern is formed by processing a film deposited to have a uniform thickness, which enables a uniform thickness in the pattern. Thus, even with a fine pattern, almost the entire area can be used as a light-emitting region. Therefore, the above manufacturing method makes it possible to achieve both high resolution and a high aperture ratio.

In many cases, an organic film formed using an FMM (Fine Metal Mask) has an extremely small taper angle (e.g., a taper angle greater than 0° and less than 30°) so that the thickness of the film becomes smaller in a portion closer to an end portion. Therefore, it is difficult to clearly observe a side surface of an organic film formed using an FMM because the side surface and a top surface are continuously connected. By contrast, in one embodiment of the present invention, an EL layer is processed without using an FMM and has a clear side surface.

In particular, in one embodiment of the present invention, part of the EL layer preferably has a taper angle greater than or equal to 30° and less than or equal to 120°, further preferably greater than or equal to 60° and less than or equal to 120°.

Note that in this specification and the like, an end portion of an object having a tapered shape indicates that the end portion of the object has a cross-sectional shape in which the angle between a side surface (a surface) of the object and a surface on which the object is formed (a bottom surface) is greater than 0° and less than 90° in a region of the end portion, and the thickness continuously increases from the end portion. A taper angle refers to an angle between a bottom surface (a surface on which an object is formed) and a side surface (a surface) at an end portion of the object.

More specific examples will be described below.

Figure 10A:
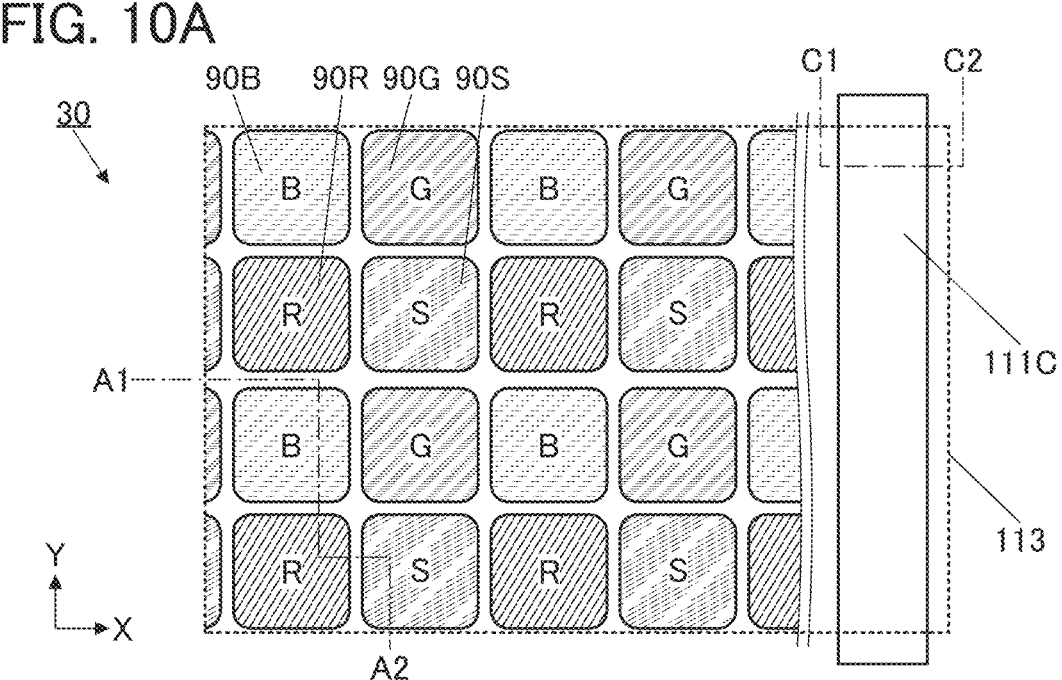
FIG. 10A and FIG. 10B are diagrams illustrating a structure example of a display apparatus.

FIG. 10A is a schematic view illustrating part of a top surface of the display apparatus 30. The display apparatus 30 includes a plurality of light-emitting devices 90R exhibiting red, a plurality of light-emitting devices 90G exhibiting green, a plurality of light-emitting devices 90B exhibiting blue, and a plurality of light-receiving devices 90S. In FIG. 10A, light-emitting regions of the light-emitting devices and the light-receiving devices are denoted by R, G, B, and S to easily differentiate the light-emitting devices.

Note that the layout of the light-emitting device 90R, the light-emitting device 90G, the light-emitting device 90B, and the light-receiving device 90S illustrated in FIG. 10A corresponds to the layout of the subpixels in FIG. 9C. The light-emitting device 90R corresponds to a light-emitting device included in the subpixel 11R, the light-emitting device 90G corresponds to a light-emitting device included in the subpixel 11G, the light-emitting device 90B corresponds to a light-emitting device included in the subpixel 11B, and the light-receiving device 90S corresponds to a light-receiving device included in the subpixel 12.

The light-emitting devices 90R, the light-emitting devices 90G, the light-emitting devices 90B, and the light-receiving devices 90S are arranged in a matrix. FIG. 10A illustrates a structure in which two elements are alternately arranged in one direction. Note that the arrangement method of the light-emitting devices is not limited thereto; another arrangement method such as a stripe arrangement, an S-stripe arrangement, a delta arrangement, a Bayer arrangement, or a zigzag arrangement may be employed; a PenTile arrangement, a diamond arrangement, or the like may also be used.

FIG. 10A also illustrates a connection electrode 111C that is electrically connected to a common electrode 113. The connection electrode 111C is supplied with a potential (e.g., an anode potential or a cathode potential) that is to be supplied to the common electrode 113. The connection electrode 111C is provided outside a display region where the light-emitting devices 90R and the like are arranged. In FIG. 10A, the common electrode 113 is denoted by the dashed line.

The connection electrode 111C can be provided along the outer periphery of the display region. For example, the connection electrode 111C may be provided along one side of the outer periphery of the display region or two or more sides of the outer periphery of the display region. That is, in the case where the display region has a rectangular top surface shape, a top surface shape of the connection electrode 111C can have a band shape, an L shape, a U shape (a square bracket shape), a quadrangular shape, or the like.

Figure 10B:
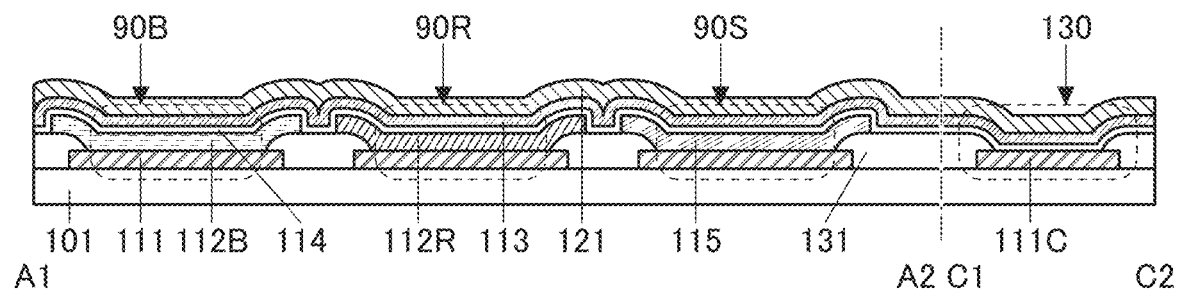

FIG. 10B is a schematic cross-sectional view taken along the dashed-dotted line A1-A2 and dashed-dotted line C1-C2 in FIG. 10A. FIG. 10B is a schematic cross-sectional view of the light-emitting device 90B, the light-emitting device 90R, the light-receiving device 90S, and the connection electrode 111C.

Note that the light-emitting device 90G that is not illustrated in the schematic cross-sectional view can have a structure similar to that of the light-emitting device 90B or the light-emitting device 90R. In the following description, the description of the light-emitting device can be referred to.

The light-emitting device 90B includes a pixel electrode 111, an organic layer 112B, an organic layer 114, and the common electrode 113. The light-emitting device 90R includes the pixel electrode 111, an organic layer 112R, an organic layer 114, and the common electrode 113. The light-receiving device 90S includes the pixel electrode 111, an organic layer 115, the organic layer 114, and the common electrode 113. The organic layer 114 and the common electrode 113 are shared by the light-emitting device 90B, the light-emitting device 90R, and the light-receiving device 90S. The organic layer 114 can also be referred to as a common layer. The pixel electrode 111 is provided over an insulating layer 101 separately for each of the light-emitting devices and the light-receiving device.

The organic layer 112R contains at least a light-emitting organic compound that emits light having a peak in the red wavelength range. The organic layer 112B contains at least a light-emitting organic compound that emits light having a peak in the blue wavelength range. The organic layer 115 contains a photoelectric conversion material that has sensitivity in the visible light or infrared light wavelength range. The organic layer 112R and the organic layer 112B can also be referred to as an EL layer. The organic layer 115 can be referred to as an active layer.

The organic layer 112R, the organic layer 112B, and the organic layer 115 may each include one or more of an electron-injection layer, an electron-transport layer, a hole-injection layer, and a hole-transport layer. The organic layer 114 does not necessarily include the light-emitting layer. For example, the organic layer 114 includes one or more of an electron-injection layer, an electron-transport layer, a hole-injection layer, and a hole-transport layer.

Here, the uppermost layer in the stacked-layer structure of the organic layer 112R, the organic layer 112B, and the organic layer 115, i.e., the layer in contact with the organic layer 114 is preferably a layer other than the light-emitting layer. For example, a structure is preferable in which an electron-injection layer, an electron-transport layer, a hole-injection layer, a hole-transport layer, or a layer other than those covers the light-emitting layer so as to be in contact with the organic layer 114. When a top surface of the light-emitting layer is protected by another layer in manufacturing each light-emitting device, the reliability of the light-emitting device can be improved.

The pixel electrode 111 is provided for each element. The common electrode 113 and the organic layer 114 are each provided as a continuous layer shared by the light-emitting devices. A conductive film having a light-transmitting property with respect to visible light is used for either the respective pixel electrodes or the common electrode 113, and a conductive film having a reflective property is used for the other. When the pixel electrodes are light-transmitting electrodes and the common electrode 113 is a reflective electrode, a bottom-emission display apparatus can be obtained; in contrast, when the respective pixel electrodes are reflective electrodes and the common electrode 113 is a light-transmitting electrode, a top-emission display apparatus can be obtained. Note that when both the pixel electrodes and the common electrode 113 have a light-transmitting property, a dual emission display apparatus can be obtained.

An insulating layer 131 is provided to cover an end portion of the pixel electrode 111. An end portion of the insulating layer 131 preferably has a tapered shape. Note that in this specification and the like, an end portion of an object having a tapered shape indicates that the end portion of the object has a cross-sectional shape in which the angle between a surface of the object and a surface on which the object is formed is greater than 0° and less than 90° in a region of the end portion, and the thickness continuously increases from the end portion.

When an organic resin is used for the insulating layer 131, a surface of the insulating layer 131 can be moderately curved. Thus, coverage with a film formed over the insulating layer 131 can be improved.

Examples of materials that can be used for the insulating layer 131 include an acrylic resin, a polyimide resin, an epoxy resin, a polyamide resin, a polyimide-amide resin, a siloxane resin, a benzocyclobutene-based resin, a phenol resin, and precursors of these resins.

Note that for the insulating layer 131, an inorganic insulating material may be used. Examples of inorganic insulating materials that can be used for the insulating layer 131 include oxides and nitrides such as silicon oxide, silicon oxynitride, silicon nitride oxide, silicon nitride, aluminum oxide, aluminum oxynitride, and hafnium oxide. In addition, yttrium oxide, zirconium oxide, gallium oxide, tantalum oxide, magnesium oxide, lanthanum oxide, cerium oxide, neodymium oxide, or the like may be used.

As illustrated in FIG. 10B, spaces are provided between two organic layers of the light-emitting devices of different colors and the light-emitting device and the light-receiving device. The organic layer 112R, the organic layer 112B, and the organic layer 115 are thus preferably provided so as not to be in contact with each other. This can suitably prevent unintentional light emission due to current flowing through two adjacent organic layers. As a result, the contrast can be increased to achieve a display apparatus with high display quality.

The organic layer 112R, the organic layer 112B, and the organic layer 115 each preferably have a taper angle of greater than or equal to 30°. In an end portion of each of the organic layer 112R, an organic layer 112B, and the organic layer 115, the angle between a side surface (a surface) and a bottom surface (a surface on which the layer is formed) is preferably greater than or equal to 30° and less than or equal to 120°, further preferably greater than or equal to 45° and less than or equal to 120°, still further preferably greater than or equal to 60° and less than or equal to 120°. Alternatively, the organic layer 112R, the organic layer 112B, and the organic layer 115 each preferably have a taper angle of 90° or a neighborhood thereof (greater than or equal to 80° and less than or equal to 100°, for example).

A protective layer 121 is provided over the common electrode 113. The protective layer 121 has a function of preventing diffusion of impurities such as water into the light-emitting devices from above.

The protective layer 121 can have, for example, a single-layer structure or a stacked-layer structure including at least an inorganic insulating film. As the inorganic insulating film, for example, an oxide film or a nitride film such as a silicon oxide film, a silicon oxynitride film, a silicon nitride oxide film, a silicon nitride film, an aluminum oxide film, an aluminum oxynitride film, or a hafnium oxide film can be given. Alternatively, a semiconductor material such as indium gallium oxide or indium gallium zinc oxide may be used for the protective layer 121.

As the protective layer 121, a stacked-layer film of an inorganic insulating film and an organic insulating film can be used. For example, a structure in which an organic insulating film is sandwiched between a pair of inorganic insulating films is preferable. Furthermore, the organic insulating film preferably functions as a planarization film. With this, the top surface of the organic insulating film can be flat, and accordingly, coverage with the inorganic insulating film thereover is improved, leading to an improvement in barrier properties. Moreover, the top surface of the protective layer 121 is flat; therefore, when a component (e.g., a color filter, an electrode of a touch sensor, a lens array, or the like) is provided above the protective layer 121, the component can be less affected by an uneven shape caused by the lower structure.

In the connection portion 130, the common electrode 113 is provided on and in contact with the connection electrode 111C and the protective layer 121 is provided to cover the common electrode 113. The insulating layer 131 is provided to cover an end portion of the connection electrode 111C.

A structure example of a display apparatus whose structure is partly different from that illustrated in FIG. 10B will be described below. Specifically, an example in which the insulating layer 131 is not provided will be described.

FIGS. 11A to 11D show examples of the case where a side surface of the pixel electrode 111 is substantially aligned with side surfaces of the organic layer 112R, the organic layer 112B, or the organic layer 115.

Figure 11A:
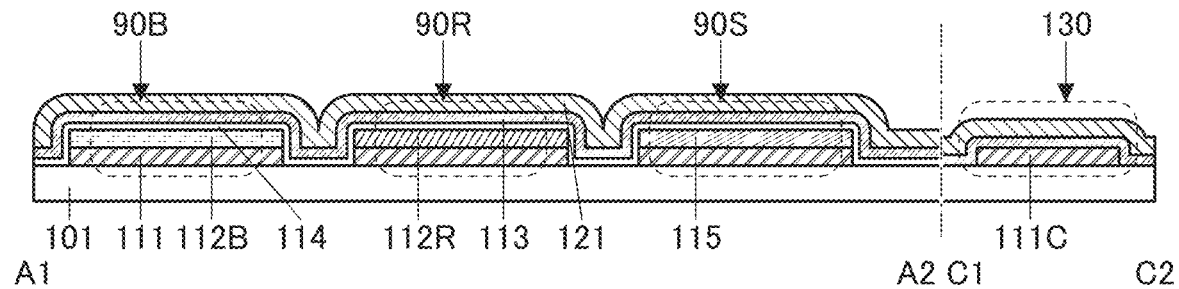
FIG. 11A to FIG. 11D are diagrams illustrating structure examples of a display apparatus.

In FIG. 11A, the organic layer 114 is provided to cover top surfaces and side surfaces of the organic layer 112R, the organic layer 112B, and the organic layer 115. The organic layer 114 can prevent the pixel electrode 111 and the common electrode 113 from being in contact with each other and being electrically short-circuited.

Figure 11B:
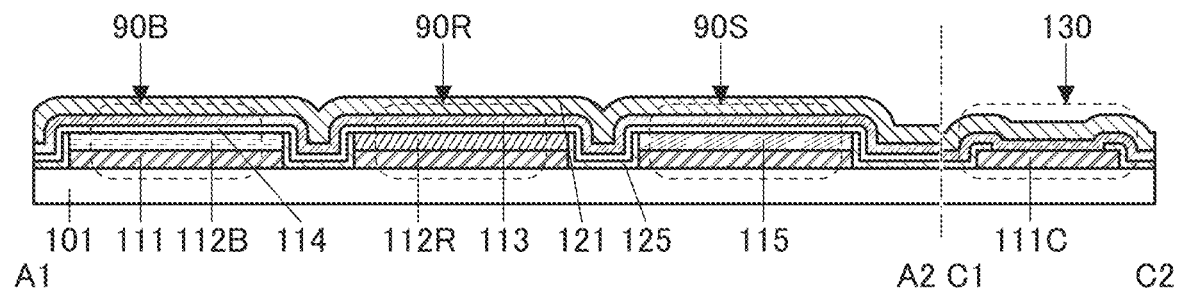

FIG. 11B illustrates an example in which an insulating layer 125 is provided to be in contact with side surfaces of the organic layer 112R, the organic layer 112B, and the organic layer 115 and a side surface of the pixel electrode 111. The insulating layer 125 can prevent the pixel electrode 111 and the common electrode 113 from being electrically short-circuited and effectively inhibit leakage current therebetween.

The insulating layer 125 can be an insulating layer containing an inorganic material. An inorganic insulating film such as an oxide insulating film, a nitride insulating film, an oxynitride insulating film, or a nitride oxide insulating film can be used for the insulating layer 125, for example. The insulating layer 125 may have a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, when an inorganic insulating film such as an aluminum oxide film, a hafnium oxide film, or a silicon oxide film formed by an ALD method is used as the insulating layer 125, the insulating layer 125 has a small number of pin holes and excels in a function of protecting the organic layer.

Note that in this specification and the like, oxynitride refers to a material that contains more oxygen than nitrogen, and nitride oxide refers to a material that contains more nitrogen than oxygen. For example, in the case where silicon oxynitride is described, it refers to a material that contains more oxygen than nitrogen in its composition. In the case where silicon nitride oxide is described, it refers to a material that contains more nitrogen than oxygen in its composition.

The insulating layer 125 can be formed by a sputtering method, a CVD method, a PLD method, an ALD method, or the like. The insulating layer 125 is preferably formed by an ALD method with favorable coverage.

Figure 11C:
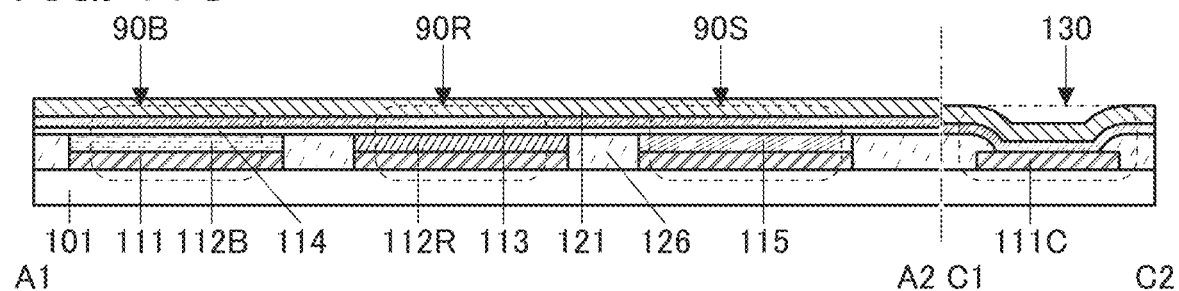

In FIG. 11C, resin layers 126 are provided between two adjacent light-emitting devices and between the light-emitting device and the light-receiving device so as to fill the space between two facing pixel electrodes and two facing organic layers. The resin layer 126 can planarize a surface on which the organic layer 114, the common electrode 113, and the like are formed; accordingly, disconnection of the common electrode 113 due to poor coverage in a step between adjacent light-emitting devices can be prevented.

As the resin layer 126, an insulating layer containing an organic material can be suitably used. For the resin layer 126, an acrylic resin, a polyimide resin, an epoxy resin, an imide resin, a polyamide resin, a polyimide-amide resin, a silicone resin, a siloxane resin, a benzocyclobutene-based resin, a phenol resin, a precursor of any of these resins, or the like can be used, for example. For the resin layer 126, an organic material such as polyvinyl alcohol (PVA), polyvinylbutyral, polyvinylpyrrolidone, polyethylene glycol, polyglycerin, pullulan, water-soluble cellulose, or an alcohol-soluble polyamide resin may be used. A photosensitive resin can also be used for the resin layer 126. A photoresist may be used for the photosensitive resin. As the photosensitive resin, a positive photosensitive material or a negative photosensitive material can be used.

A material that absorbs visible light is suitably used as the resin layer 126. When a material that absorbs visible light is used for the resin layer 126, light emitted from the EL layer can be absorbed by the resin layer 126, which enables blocking stray light from the adjacent pixel and prevention of color mixture. Thus, a display apparatus with high display quality can be provided.

Figure 11D:
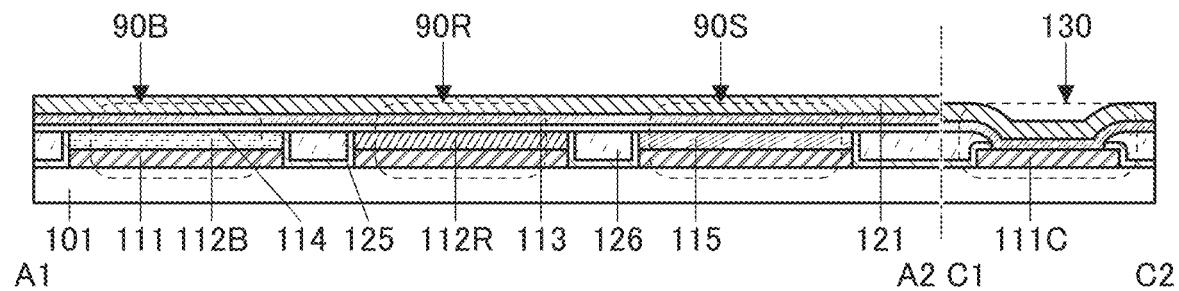

In FIG. 11D, the insulating layer 125 and the resin layer 126 over the insulating layer 125 are provided. Since the insulating layer 125 prevents the organic layer 112R or the like from being in contact with the resin layer 126, impurities such as moisture included in the resin layer 126 can be prevented from being diffused into the organic layer 112R or the like, whereby a highly reliable display apparatus can be provided.

A reflective film (e.g., a metal film containing one or more of silver, palladium, copper, titanium, aluminum, and the like) may be provided between the insulating layer 125 and the resin layer 126 so that light emitted from the light-emitting layer is reflected by the reflective film; hence, the display apparatus may be provided with a function of increasing the light extraction efficiency.

Figure 12A:
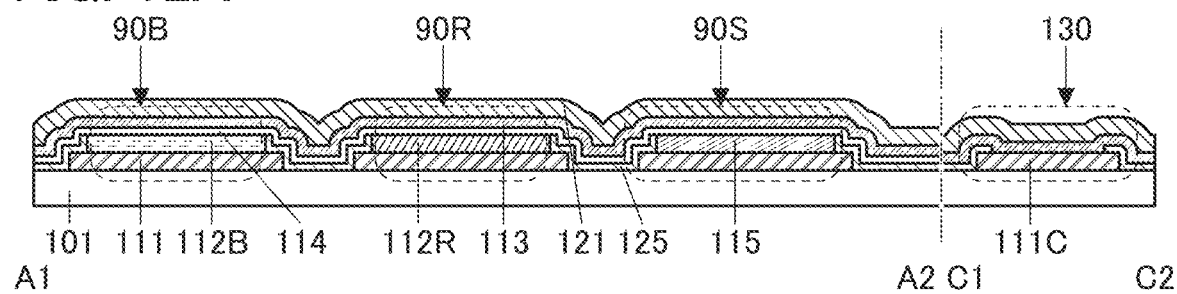
FIG. 12A to FIG. 12C are diagrams illustrating structure examples of a display apparatus.
Figure 12B:
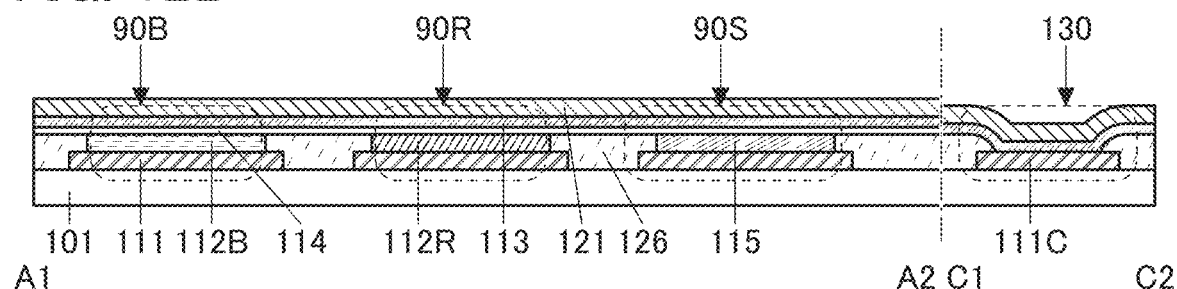
Figure 12C:
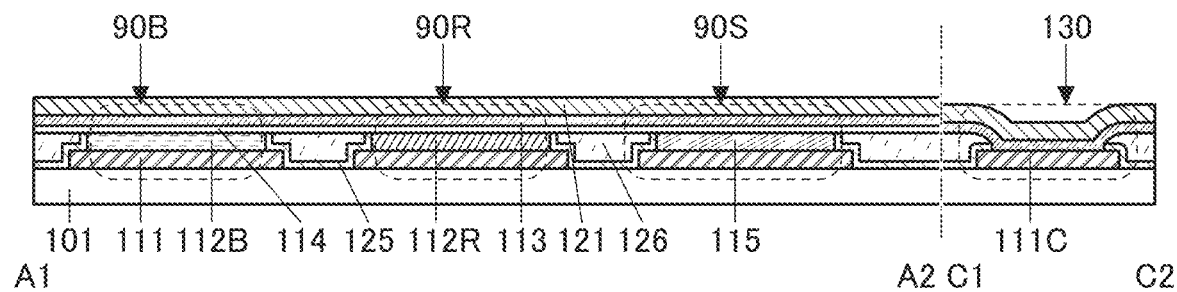

FIG. 12A to FIG. 12C show examples in which the width of the pixel electrode 111 is larger than the width of the organic layer 112R, the organic layer 112B, or the organic layer 115. The organic layer 112R or the like is provided more inwardly than end portions of the pixel electrode 111.

FIG. 12A illustrates an example in which the insulating layer 125 is provided. The insulating layer 125 is provided to cover a side surface of the organic layer included in the light-emitting element or the light-receiving element and a side surface and part of a top surface of the pixel electrode 111.

FIG. 12B illustrates an example in which the resin layer 126 is provided. The resin layer 126 is positioned between two adjacent light-emitting devices or between the light-emitting device and the light-receiving device and covers a side surface of the organic layer and a top and side surfaces of the pixel electrode 111.

FIG. 12C illustrates an example in which both the insulating layer 125 and the resin layer 126 are provided. The insulating layer 125 is provided between the organic layer 112R or the like and the resin layer 126.

FIG. 13A to FIG. 13D show examples in which the width of the pixel electrode 111 is smaller than the width of the organic layer 112R, the organic layer 112B, or the organic layer 115. The organic layer 112R or the like extends to an outer side beyond the end portions of the pixel electrode 111.

Figure 13A:
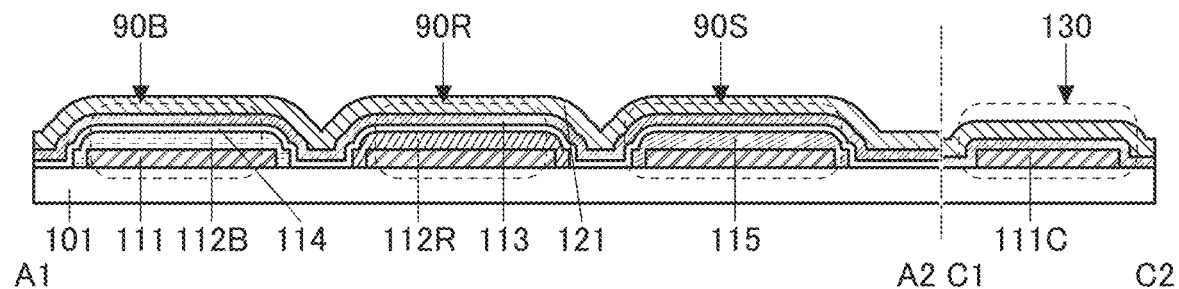
FIG. 13A to FIG. 13D are diagrams illustrating structure examples of a display apparatus.
Figure 13B:
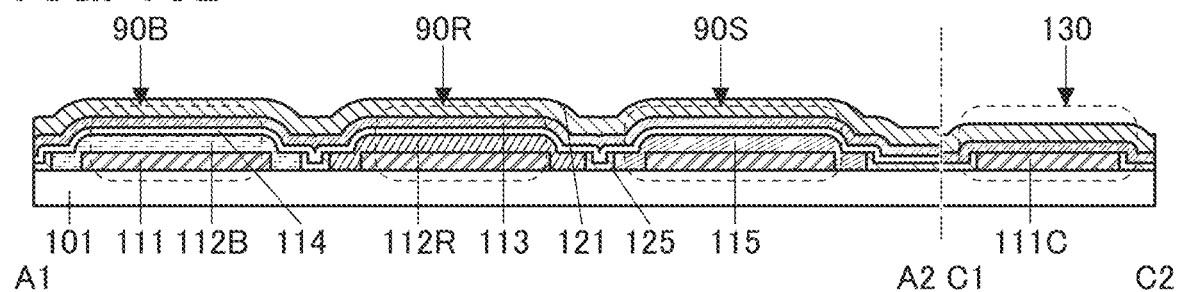

FIG. 13B illustrates an example in which the insulating layer 125 is provided. The insulating layer 125 is provided in contact with side surfaces of the organic layers of two adjacent light-emitting devices. The insulating layer 125 may be provided to cover not only the side surface but also part of a top surface of the organic layer 112R or the like.

Figure 13C:
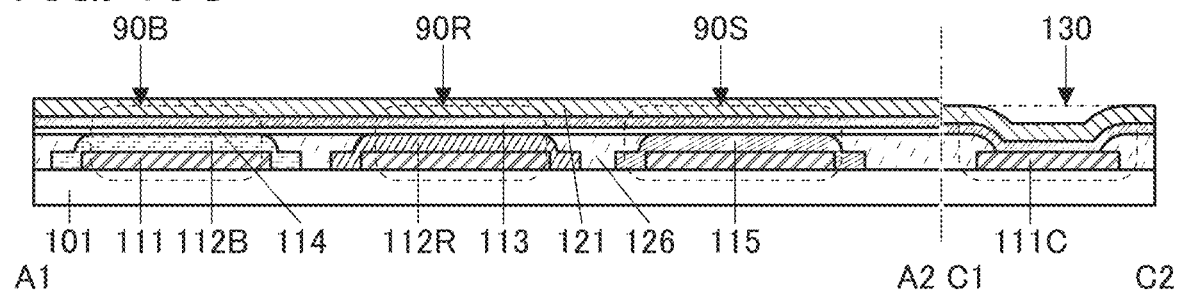

FIG. 13C illustrates an example in which the resin layer 126 is provided. The resin layer 126 is positioned between two adjacent light-emitting devices and covers a side surface and part of a top surface of the organic layer 112R or the like. The resin layer 126 may be formed to be in contact with the side surface of the organic layer 112R or the like and not to cover the top surface thereof.

Figure 13D:
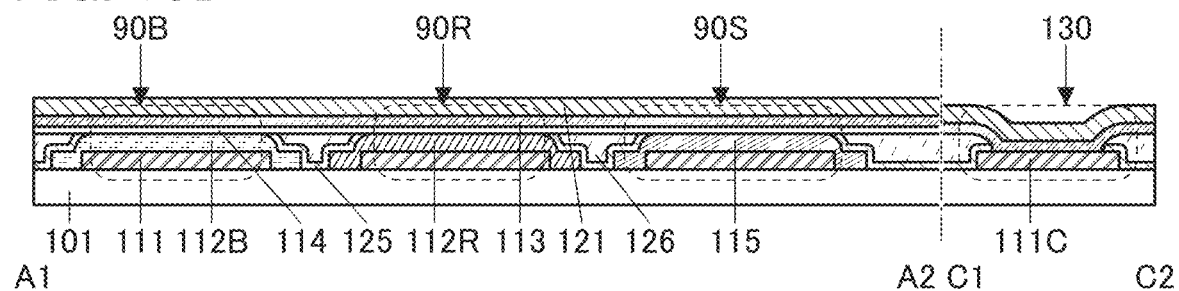

FIG. 13D illustrates an example in which both the insulating layer 125 and the resin layer 126 are provided. The insulating layer 125 is provided between the organic layer 112R or the like and the resin layer 126.

Figure 14A:
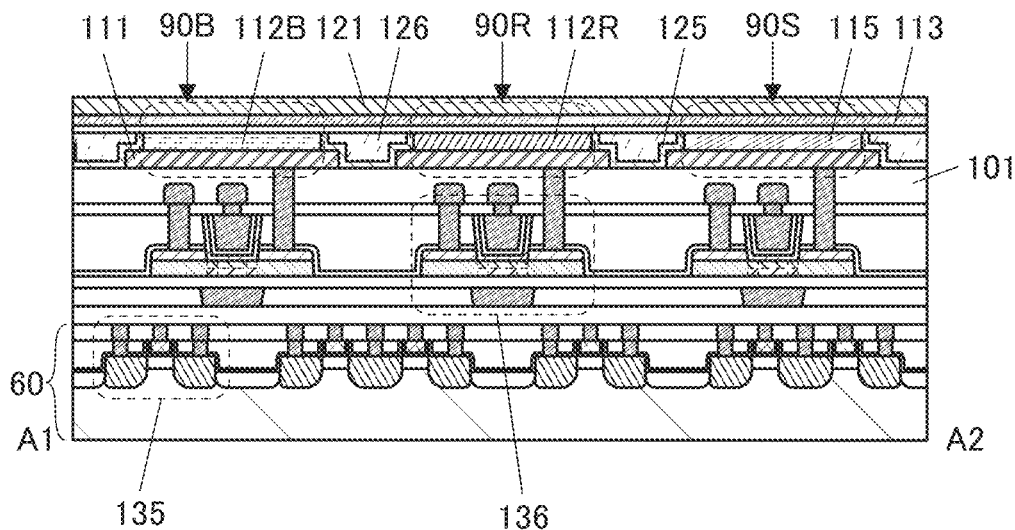
FIG. 14A to FIG. 14C are cross-sectional views each illustrating a display apparatus.

Next, a structure example of components below the pixel electrode 111, an example of using a white-light-emitting device, and the like are described. FIG. 14A is a schematic cross-sectional view taken along the dashed-dotted line A1-A2 in FIG. 10A. Note that although the structures of the light-emitting device 90B, the light-emitting device 90R, and the light-receiving device 90S are those illustrated in FIG. 12C as an example, any of the other structures described above may be employed.

The pixel electrode 111 is electrically connected to one of a source and a drain of a transistor 136. A transistor including a metal oxide in a channel formation region (hereinafter, an OS transistor) can be used as the transistor 136, for example. The OS transistor has higher mobility than amorphous silicon and has excellent electrical characteristics. In addition, a crystallization step needed in the manufacturing process using polycrystalline silicon is not necessary for the OS transistor, and the OS transistor can be fabricated in a back-end-of-line process or the like.

Therefore, the OS transistor can be formed over a transistor 135 using silicon in a channel formation region formed with the substrate 60 (hereinafter, such a transistor is referred to as Si transistor) without a bonding step or the like. As the substrate 60, a single crystal silicon substrate, an SOI substrate, a glass substrate whose surface is provided with single crystal silicon or polysilicon, or the like, can be typically used.

Here, the transistor 136 is included in a pixel circuit. Note that the pixel circuit including a light-emitting device has a structure different from that including a light-receiving device. The details of the circuits are described later.

The transistor 135 is included in functional circuits such as a driver circuit for the pixel circuit, a memory circuit, and an arithmetic circuit. In other words, the pixel circuit can be formed over the functional circuit, which enables formation of a display device with a narrow bezel.

As a semiconductor material used for an OS transistor, a metal oxide whose energy gap is greater than or equal to 2 eV, preferably greater than or equal to 2.5 eV, further preferably greater than or equal to 3 eV can be used.

In an OS transistor, a semiconductor layer has a large energy gap, and thus the OS transistor has an extremely low off-state current of several yoctoamperes per micrometer (current per micrometer of a channel width). The off-state current value per micrometer of channel width of the OS transistor at room temperature can be lower than or equal to 1 aA ($1\times10^{-18}$ A), lower than or equal to 1 zA ($1\times10^{-21}$ A), or lower than or equal to 1 yA ($1\times10^{-24}$ A). Note that the off-state current per micrometer of channel width of a Si transistor at room temperature is higher than or equal to 1 fA ($1\times10^{-15}$ A) and lower than or equal to 1 pA ($1\times10^{-12}$ A). In other words, the off-state current of an OS transistor is lower than that of a Si transistor by approximately ten orders of magnitude.

An OS transistor has features such that impact ionization, an avalanche breakdown, a short-channel effect, or the like does not occur, which are different from those of a Si transistor. Thus, the use of an OS transistor enables formation of a circuit having high withstand voltage and high reliability. Moreover, variation in electrical characteristics due to crystallinity unevenness, which is caused in Si transistors, is less likely to occur in OS transistors.

A semiconductor layer in an OS transistor can be, for example, a film represented by an In-M-Zn-based oxide that contains indium, zinc, and M (one or more of metals such as aluminum, titanium, gallium, germanium, yttrium, zirconium, lanthanum, cerium, tin, neodymium, and hafnium). The In-M-Zn-based oxide can be typically formed by a sputtering method. Alternatively, the In-M-Zn-based oxide can be formed by an ALD (Atomic layer deposition) method.

For example, an oxide (IGZO), which contains indium (In), gallium (Ga), and zinc (Zn), can be used as the In-M-Zn-based oxide. Alternatively, an oxide (IAZO), which contains indium (In), aluminum (Al), and zinc (Zn), may be used. Further alternatively, an oxide (IAGZO), which contains indium (In), aluminum (Al), gallium (Ga), and zinc (Zn), may be used.

It is preferable that the atomic ratio of metal elements in a sputtering target used to form an In-M-Zn oxide by a sputtering method satisfy In≥M and Zn≥M. The atomic ratio of metal elements in such a sputtering target is preferably, for example, In:M:Zn=1:1:1, In:M:Zn=1:1:1.2. In:M:Zn=1:3:2, In:M:Zn=3:1:2, In:M:Zn=4:2:3, In:M:Zn=4:2:4.1, In:M:Zn=5:1:6, In:M:Zn=5:1:7, In:M:Zn=5:1:8, or the like, or a composition in the neighborhood thereof. Note that the atomic ratio in the deposited semiconductor layer varies from the atomic ratio of metal elements of the sputtering target in a range of ±40%.

An oxide semiconductor with low carrier density is used for the semiconductor layer. For example, for the semiconductor layer, an oxide semiconductor whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, even further preferably lower than $1\times10^{10}/cm^3$, and higher than or equal to $1\times10^{-9}/cm^3$ can be used. Such an oxide semiconductor is referred to as a highly purified intrinsic or substantially highly purified intrinsic oxide semiconductor. The oxide semiconductor has a low density of defect states and can thus be referred to as an oxide semiconductor having stable characteristics.

Note that the composition is not limited to those, and a material having appropriate composition may be used depending on required semiconductor characteristics and electrical characteristics of the transistor (field-effect mobility, threshold voltage, or the like). To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

Note that the display apparatus shown in FIG. 14A includes an OS transistor and a light-emitting device having the MML (metal mask less) structure. With this structure, the leakage current that might flow through the transistor and the leakage current that might flow between adjacent light-emitting elements (also referred to as a lateral leakage current, a side leakage current, or the like) can become extremely low. With the structure, a viewer can notice any one or more of the image crispness, the image sharpness, and a high contrast ratio in an image displayed on the display device. With the structure where the leakage current that might flow through the transistor and the lateral leakage current that might flow between light-emitting elements are extremely low, display with little leakage of light at the time of black display (also referred to as deep black display) can be achieved.

Figure 14B:
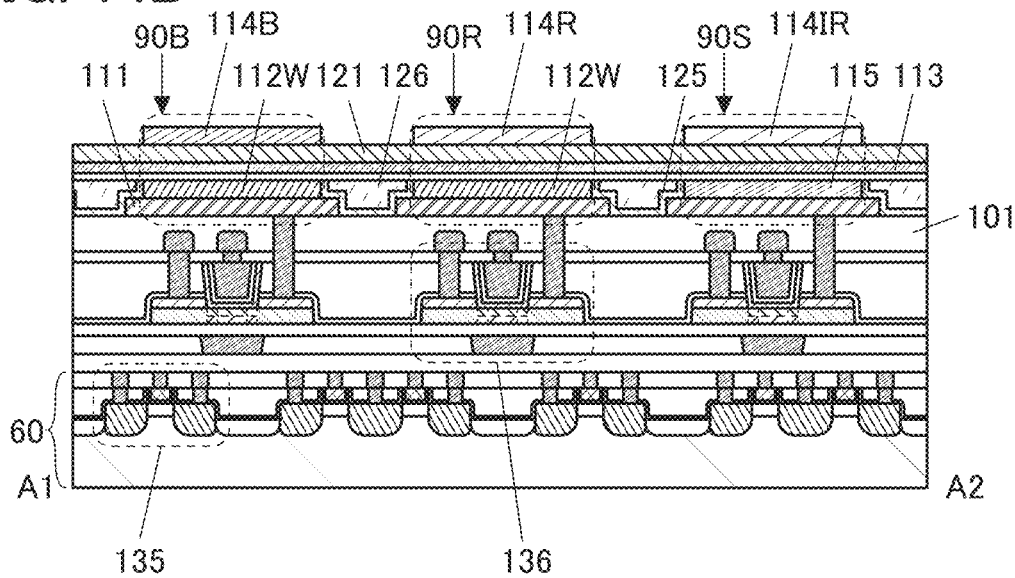

Although the structure exemplified in FIG. 14A includes different light-emitting layers in the light-emitting devices between B and R, the component structure is not limited thereto. For example, as illustrated in FIG. 14B, a coloring method may be employed in which the light-emitting devices 90B and 90R are formed by providing organic layers 112W that emit white light and providing coloring layers 114B (blue) and 114R (red) that overlap with the organic layers 112W. Note that the light-emitting device 90G not illustrated is provided with an organic layer 112W and a coloring layer 114G (green).

The organic layer 112W can have a tandem structure in which EL layers emitting R. G. and B light are connected in series, for example. Alternatively, a structure in which light-emitting layers emitting R, G, and B light are connected in series may be used. As the coloring layers 114R, 114G, and 114B, for example, red, green, and blue color filters can be used.

In addition, a filter 114IR may be provided to overlap with the organic layer 115. The filter 114IR preferably transmits infrared light and has a feature of blocking at least visible light. The organic layer 115 preferably has high sensitivity mainly to infrared light, but sometimes has sensitivity to a wavelength of visible light or the like. Thus, reflected light or the like of light emitted by the light-emitting light is detected, which causes noise components. Hence, the filter 114IR blocking visible light is preferably provided to overlap with the organic layer 115.

Figure 14C:
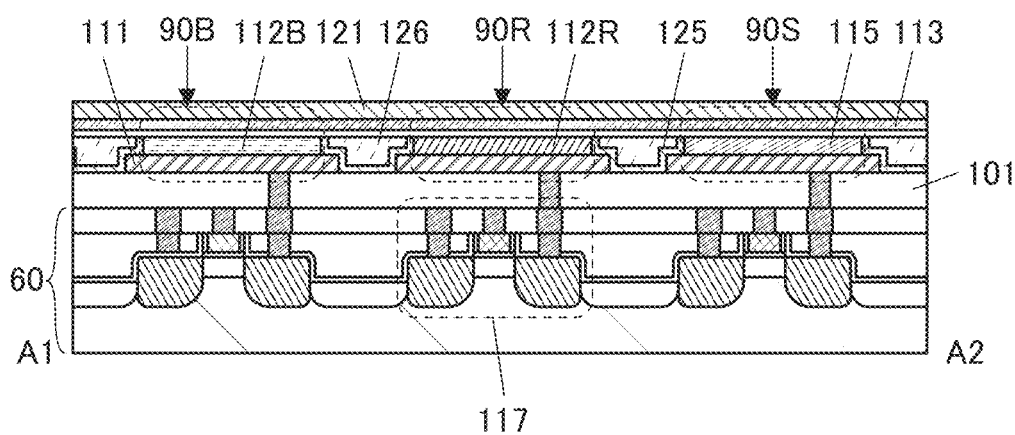

As illustrated in FIG. 14C, a pixel circuit may be formed with a transistor 117 using the substrate 60, and one of a source and a drain of the transistor 117 may be electrically connected to the pixel electrode 111. Note that the filter 114IR illustrated in FIG. 14B may be used in the structures of FIG. 14A and FIG. 14C.

At least part of this embodiment can be implemented in combination with the other embodiments described in this specification as appropriate.

Embodiment 3

In this embodiment, a circuit of a pixel included in the display apparatus 30 will be described.

A pixel of the display apparatus according to one embodiment of the present invention includes the subpixels 11 and 12. A pixel circuit PIX1 of the subpixel 11 includes a light-emitting device that emits visible light. A pixel circuit PIX2 of the subpixel 12 includes a light-receiving device.

Figure 15A:
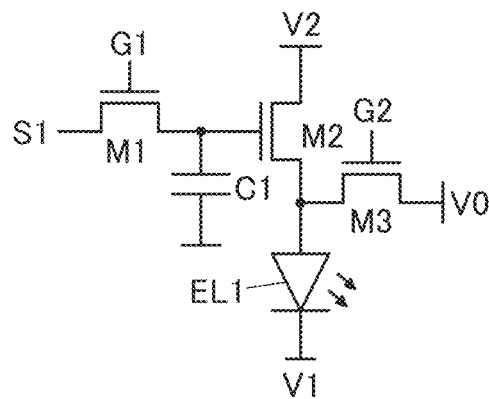
FIG. 15A to FIG. 15D are diagrams each illustrating a pixel circuit.

FIG. 15A illustrates an example of the pixel circuit PIX1 of the subpixel 11. The pixel circuit PIX1 includes a light-emitting device EL1, a transistor M1, a transistor M2, a transistor M3, and a capacitor C1. Here, an example in which a light-emitting diode is used as the light-emitting device EL1 is shown. An organic EL element that emits visible light is preferably used as the light-emitting device EL1.

A gate of the transistor M1 is electrically connected to a wiring G1, one of a source and a drain of the transistor M1 is electrically connected to a wiring S1, and the other of the source and the drain of the transistor M1 is electrically connected to one electrode of the capacitor C1 and a gate of the transistor M2. One of a source and a drain of the transistor M2 is electrically connected to a wiring V2, and the other is electrically connected to an anode of the light-emitting device EL1 and one of a source and a drain of the transistor M3. A gate of the transistor M3 is electrically connected to a wiring G2, and the other of the source and the drain of the transistor M3 is electrically connected to a wiring V0. A cathode of the light-emitting device EL1 is electrically connected to a wiring V1.

A constant potential is supplied to each of the wiring V1 and the wiring V2. Light emission can be performed when the anode side of the light-emitting device EL1 is set to a high potential and the cathode side is set to a low potential. The transistor M1 is controlled by a signal supplied to the wiring G1 and functions as a selection transistor for controlling a selection state of the pixel circuit PIX1. The transistor M2 functions as a driving transistor that controls a current flowing through the light-emitting device EL1 in accordance with a potential supplied to the gate.

When the transistor M1 is in a conduction state, a potential supplied to the wiring S1 is supplied to the gate of the transistor M2, and the emission luminance of the light-emitting device EL1 can be controlled in accordance with the potential. The transistor M3 is controlled by a signal supplied to the wiring G2. Accordingly, a potential between the transistor M3 and the light-emitting device EL1 can be reset to a constant potential supplied from the wiring V0; thus, a potential can be written to the gate of the transistor M2 in the state where the source potential of the transistor M2 is stabilized.

Figure 15B:
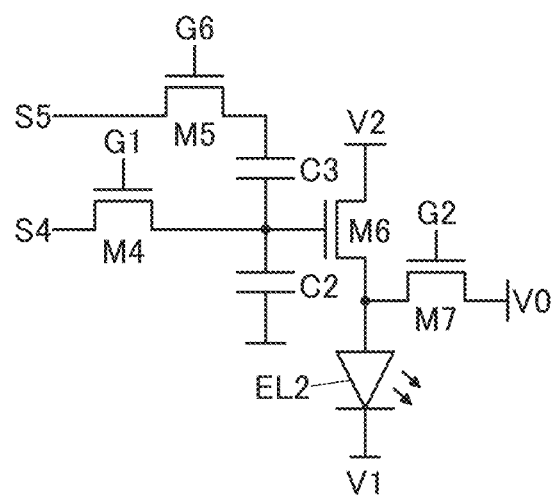

FIG. 15B illustrates an example of the pixel circuit PIX2 that is different from the example of the pixel circuit PIX1. The pixel circuit PIX2 has a function of boosting a voltage. The pixel circuit PIX2 includes a light-emitting device EL2, a transistor M4, a transistor M5, a transistor M6, a transistor M7, a capacitor C2, and a capacitor C3. Here, an example in which a light-emitting diode is used as the light-emitting device EL2 is shown. The pixel circuit PIX2 can be used for all the subpixels 11 (the subpixel 11R, the subpixel 11G, and the subpixel 11B) included in the pixel 10. The pixel circuit PIX2 may be used for one or two of the subpixel 11R, the subpixel 11G, and the subpixel 11B.

A gate of the transistor M4 is electrically connected to the wiring G1, one of a source and a drain of the transistor M4 is electrically connected to a wiring S4, and the other of the source and the drain of the transistor M4 is electrically connected to one electrode of the capacitor C2, one electrode of the capacitor C3, and a gate of the transistor M6. A gate of the transistor M5 is electrically connected to a wiring G6, one of a source and a drain of the transistor M5 is electrically connected to a wiring S5, and the other of the source and the drain of the transistor M5 is electrically connected to the other electrode of the capacitor C3.

One of a source and a drain of the transistor M6 is electrically connected to the wiring V2, and the other is electrically connected to an anode of the light-emitting device EL2 and one of a source and a drain of the transistor M7. A gate of the transistor M7 is electrically connected to the wiring G2, and the other of the source and the drain of the transistor M7 is electrically connected to the wiring V0. A cathode of the light-emitting device EL2 is electrically connected to the wiring V1.

The transistor M4 is controlled by a signal supplied to the wiring G1, and the transistor M5 is controlled by a signal supplied to the wiring G6. The transistor M6 functions as a driving transistor that controls a current flowing through the light-emitting device EL2 in accordance with a potential supplied to the gate.

The emission luminance of the light-emitting device EL2 can be controlled in accordance with the potential supplied to the gate of the transistor M6. The transistor M7 is controlled by a signal supplied to the wiring G2. A potential between the transistor M6 and the light-emitting device EL2 can be reset to a constant potential supplied from the wiring V0; thus, a potential can be written to the gate of the transistor M6 in the state where the source potential of the transistor M6 is stabilized. In addition, when the potential supplied from the wiring V0 is set to the same potential as the potential of the wiring V1 or a potential lower than that of the wiring V1, light emission of the light-emitting device EL2 can be inhibited.

The function of boosting a voltage, which the pixel circuit PIX2 has, will be described below.

First, a potential "D1" of the wiring S4 is supplied to the gate of the transistor M6 through the transistor M4, and at timing overlapping with this, a reference potential "$V_{ref}$" is supplied to the other electrode of the capacitor C3 through the transistor M5. At this time, "$D1-V_{ref}$" is stored in the capacitor C3. Next, the gate of the transistor M6 is set to be floating, and a potential "D2" of the wiring S5 is supplied to the other electrode of the capacitor C3 through the transistor M5. Here, the potential "D2" is a potential for addition.

At this time, the potential of the gate of the transistor M6 is $D1+(C_3/(C_3+C_2+C_{M6}))\times(D2-V_{ref})$, where $C_3$ is the capacitance value of the capacitor C3, $C_2$ is the capacitance value of the capacitor C2, and $C_{M6}$ is the capacitance value of the gate of the transistor M6. Here, assuming that the value of C3 is sufficiently larger than the value of $C_2+C_{M6}$, $C_3/(C_3+C_2+C_{M6})$ approximates 1. Thus, it can be said that the potential of the gate of the transistor M6 approximates "$D1+(D2-V_{ref})$". Then, when D1=D2 and $V_{ref}$=0, "$D1+(D2-V_{ref})$"="2D1".

That is, when the circuit is designed appropriately, a potential approximately twice as high as the potential that can be input from the wiring S4 or S5 can be supplied to the gate of the transistor M6.

Owing to such action, a high voltage can be generated in the pixel circuit. Thus, the voltage to be input to the pixel circuit can be low and power consumption of a driver circuit can be reduced.

Figure 15C:
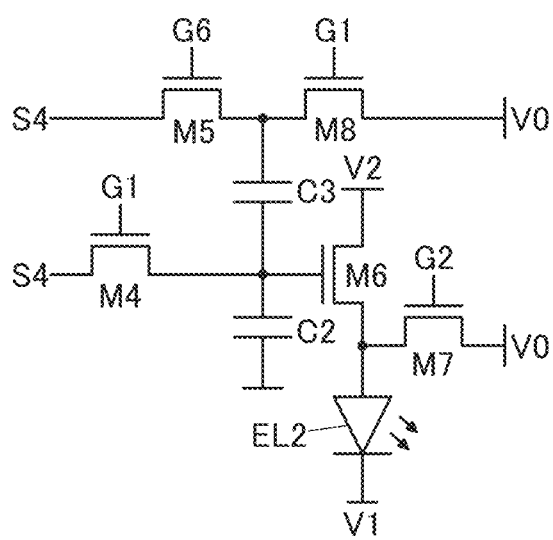

Alternatively, the pixel circuit PIX2 may have a structure illustrated in FIG. 15C. The pixel circuit PIX2 illustrated in FIG. 15C differs from the pixel circuit PIX2 illustrated in FIG. 15B in including a transistor M8. A gate of the transistor M8 is electrically connected to the wiring G1, one of a source and a drain of the transistor M8 is electrically connected to the other of the source and the drain of the transistor M5 and the other electrode of the capacitor C3, and the other of the source and the drain of the transistor M8 is electrically connected to the wiring V0. The one of the source and the drain of the transistor M5 is connected to the wiring S4.

As described above, in the pixel circuit PIX2 illustrated in FIG. 15B, operations of supplying the reference potential and the potential for addition to the other electrode of the capacitor C3 through the transistor M5 are performed. In this case, the two wirings S4 and S5 are necessary and the reference potential and the potential for addition need to be rewritten alternately in the wiring S5.

In the pixel circuit PIX2 illustrated in FIG. 15C, although the transistor M8 is additionally provided, the wiring S5 can be omitted because a dedicated path for supplying the reference potential is provided. Furthermore, since the gate of the transistor M8 can be connected to the wiring G1 and the wiring V0 can be used as a wiring for supplying the reference potential, a wiring connected to the transistor M8 is not additionally provided. Moreover, alternate rewriting of the reference potential and the potential for addition with one wiring is not performed, which makes it possible to achieve high-speed operation with low power consumption.

Note that in FIG. 15B and FIG. 15C, "D1B", an inversion potential of "D1", may be used as the reference potential "$V_{ref}$". In this case, a potential approximately three times as high as the potential that can be input from the wiring S4 or S5 can be supplied to the gate of the transistor M6. Note that the inversion potential refers to a potential such that the absolute value of the difference between the potential and a reference potential is the same (or substantially the same) as that of the difference between the original potential and the reference potential, and the potential is different from the original potential. The relation $V_0=(D1+D1B)/2$ is preferably satisfied, where "D1" is the original potential, "D1B" is the inversion potential, and $V_0$ is the reference potential.

In the display apparatus of this embodiment, the light-emitting device may be made to emit light in a pulsed manner so as to display an image. A reduction in the driving time of the light-emitting device can reduce power consumption of the display apparatus and inhibit heat generation. An organic EL element is particularly preferable because of its favorable frequency characteristics. The frequency can be higher than or equal to 1 KHz and lower than or equal to 100 MHz, for example.

Figure 15D:
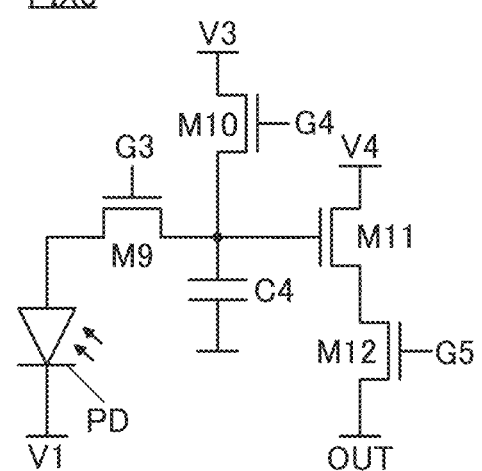

FIG. 15D illustrates an example of a pixel circuit PIX3 of the subpixel 12. The pixel circuit PIX3 includes a light-receiving device PD, a transistor M9, a transistor M10, a transistor M11, a transistor M12, and a capacitor C4. Here, a photodiode is used as an example of the light-receiving device PD.

A cathode of the light-receiving device PD is electrically connected to the wiring V1, and an anode of the light-receiving device PD is electrically connected to one of a source and a drain of the transistor M9. A gate of the transistor M9 is electrically connected to a wiring G3, and the other of the source and the drain of the transistor M9 is electrically connected to one electrode of the capacitor C4, one of a source and a drain of the transistor M10, and a gate of the transistor M11. A gate of the transistor M10 is electrically connected to a wiring G4, and the other of the source and the drain of the transistor M10 is electrically connected to a wiring V3. One of a source and a drain of the transistor M11 is electrically connected to a wiring V4, and the other of the source and the drain of the transistor M11 is electrically connected to one of a source and a drain of the transistor M12. A gate of the transistor M12 is electrically connected to a wiring G5, and the other of the source and the drain of the transistor M12 is electrically connected to a wiring OUT.

A constant potential is supplied to each of the wiring V1, the wiring V3, and the wiring V4. When the light-receiving device PD is driven with a reverse bias, a potential lower than the potential of the wiring V1 is supplied to the wiring V3. The transistor M10 is controlled by a signal supplied to the wiring G5 and has a function of resetting the potential of a node connected to the gate of the transistor M11 to a potential supplied to the wiring V3. The transistor M9 is controlled by a signal supplied to the wiring G3 and has a function of controlling the timing at which the potential of the node changes, in accordance with a current flowing through the light-receiving device PD. The transistor M11 functions as an amplifier transistor for outputting a signal corresponding to the potential of the node. The transistor M12 is controlled by a signal supplied to the wiring G6 and functions as a selection transistor for reading an output corresponding to the potential of the node by an external circuit connected to the wiring OUT. Here, it is preferable to use, as each of the transistors M1 to M12 included in the pixel circuits PIX1 to PIX3, a transistor including a metal oxide (an oxide semiconductor) in a semiconductor layer where a channel is formed.

A transistor using a metal oxide having a wider band gap and a lower carrier density than silicon achieves an extremely low off-state current. Such a low off-state current enables retention of charge accumulated in a capacitor that is connected in series with the transistor for a long time.

Therefore, it is preferable to use transistors including an oxide semiconductor particularly as the transistor M1, the transistor M4, the transistor M5, the transistor M8, the transistor M9, and the transistor M10, in each of which one or the other of the source and the drain is connected to the capacitor C1, the capacitor C2, the capacitor C3, or the capacitor C4. With use of transistors employing an oxide semiconductor in the subpixel 12, a global shutter system in which all the pixels perform the operation of accumulating electric charge at the same time can be employed without complicated circuit structures and driving methods.

Moreover, the use of transistors using an oxide semiconductor as the other transistors can reduce the manufacturing cost.

Alternatively, transistors using silicon as a semiconductor in which a channel is formed can be used as the transistor M1 to the transistor M12. It is particularly preferable to use silicon with high crystallinity, such as single crystal silicon or polycrystalline silicon, because high field-effect mobility can be achieved and higher-speed operation can be performed.

Alternatively, a structure may be employed in which a transistor employing an oxide semiconductor is used as one or more of the transistors M1 to M12 and transistors employing silicon are used as the other transistors.

Note that although FIG. 15A to FIG. 15D each illustrate an example in which n-channel transistors are used, p-channel transistors can also be used.

The transistors included in the pixel circuit PIX1, the transistors included in the pixel circuit PIX2, and the transistors included in the pixel circuit PIX3 are preferably formed side by side over the same substrate. In addition, of the wirings connected to the pixel circuits PIX1 to PIX3, wirings that are denoted by common reference numerals in FIG. 15A to FIG. 15D may be common wirings.

One or more layers including the transistor and/or the capacitor are preferably provided to overlap with the light-receiving device PD, the light-emitting device EL1, or the light-emitting device EL2. Thus, the effective area of each pixel circuit can be reduced, and a high-resolution light-receiving portion or display portion can be achieved.

Figure 16A:
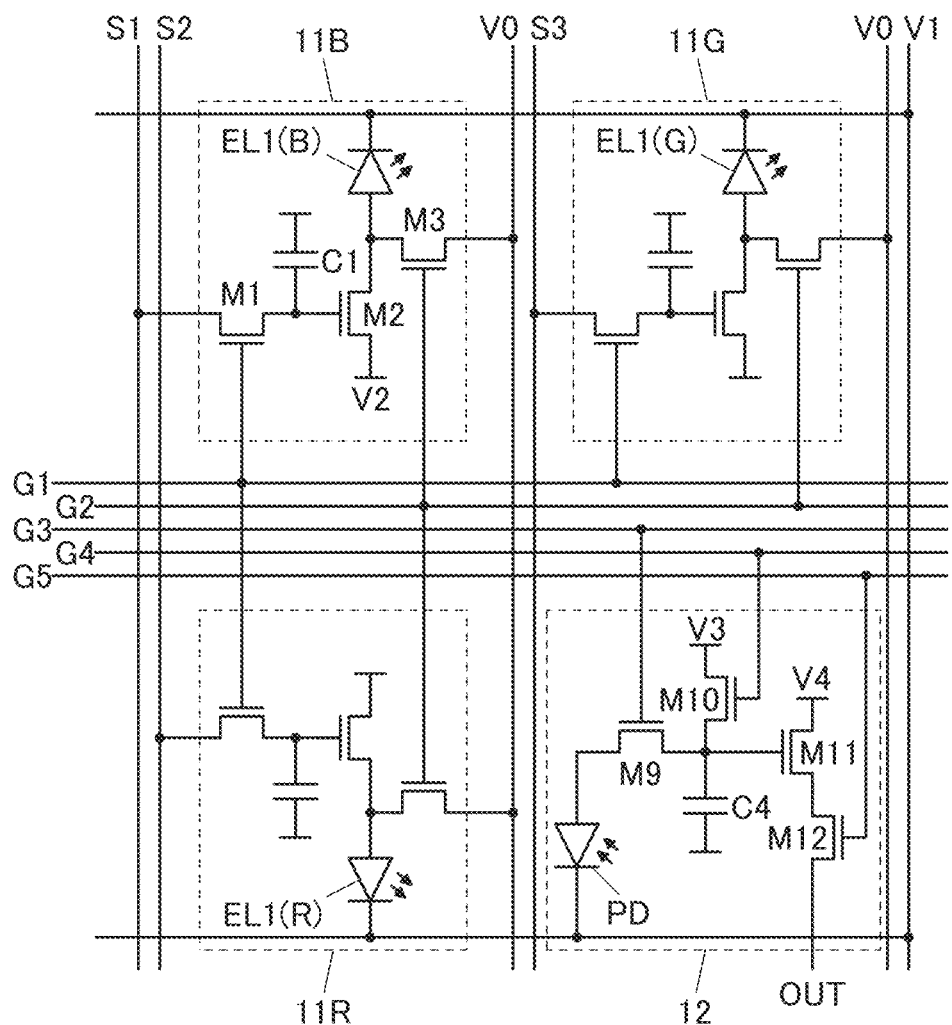
FIG. 16A and FIG. 16B are diagrams illustrating pixel circuits.

FIG. 16A is an example of a circuit diagram of the subpixel 11 (the subpixel 11R, the subpixel 11G, and the subpixel 11B) and the subpixel 12 included in the pixel 10. The wiring G1 and the wiring G2 can be electrically connected to the gate driver (FIG. 9A, the circuit 16). The wiring G3 to the wiring G5 can be electrically connected to the row driver (FIG. 9A, the circuit 18). The wirings S1 to S3 can be electrically connected to the source driver (FIG. 9A, the circuit 15). The wiring OUT can be electrically connected to the column driver (FIG. 9A, the circuit 17) and the reading circuit (FIG. 9A, the circuit 19).

A power supply circuit that supplies a constant potential can be electrically connected to the wirings V0 to V4, a low potential can be supplied to the wirings V0 and V3, and a high potential can be supplied to the wirings V1, V2, and V4.

Figure 16B:
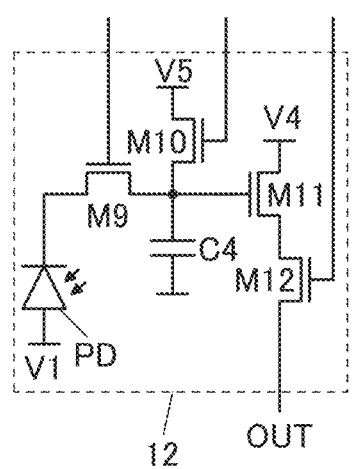

Furthermore, a structure may be employed in which the anode of the light-receiving device PD in the subpixel 12 is electrically connected to the wiring V1 and the other of the source and the drain of the transistor M10 is electrically connected to the wiring V5, as illustrated in FIG. 16B. At this time, the wiring V5 can supply a potential higher than the potential supplied to the wiring V1. For another example, the wiring V5 may be electrically connected to the wiring V4.

In one embodiment of the present invention, a power supply line or the like can be shared by the subpixel 11 and the subpixel 12, whereby the number of wirings can be reduced, resulting in a high pixel density.

At least part of this embodiment can be implemented in combination with the other embodiments described in this specification as appropriate.

REFERENCE NUMERALS

C1: capacitor, C2: capacitor, C3: capacitor, C4: capacitor, G1: wiring, G2: wiring, G3: wiring, G4: wiring, G5: wiring, G6: wiring, M1: transistor, M2: transistor, M3: transistor, M4: transistor, M5: transistor, M6: transistor, M7: transistor, M8: transistor, M9: transistor, M10: transistor, M11: transistor, M12: transistor, PIX1: pixel circuit, PIX2: pixel circuit, PIX3: pixel circuit, S1: wiring, S3: wiring, S4: wiring, S5: wiring, V0: wiring, V1: wiring, V2: wiring, V3: wiring, V4: wiring, V5: wiring, 10: pixel, 11: subpixel, 11B: subpixel, 11G: subpixel, 11R: subpixel, 11W: subpixel, 12: subpixel, 14: pixel array, 15: circuit, 16: circuit, 17: circuit, 18: circuit, 19: circuit, 20: electronic device, 21: electronic device, 30: display apparatus, 31: lens, 32: light-transmission plate, 33: light source, 33*a*: light source, 33*b*: light source, 33*c*: light source, 33*d*: light source, 34: optical window, 35: mirror, 35*a*: mirror, 35*b*: mirror, 35*c*: mirror, 35*d*: mirror, 38: housing, 39: slide mechanism, 40: eye, 51: light-emitting diode, 52: lens, 53: light-blocking wall, 60: substrate, 90B: light-emitting device, 90G: light-emitting device, 90R: light-emitting device, 90S: light-receiving device, 101: insulating layer, 111: pixel electrode, 111C: connection electrode, 112B: organic layer, 112R: organic layer, 112W: organic layer, 113: common electrode, 114: organic layer, 114B: coloring layer, 114G: coloring layer, 114IR: filter, 114R: coloring layer, 115: organic layer, 117: transistor, 121: protective layer, 125: insulating layer, 126: resin layer, 130: connection portion, 131: insulating layer, 135: transistor, 136: transistor

The invention claimed is:

1. An electronic device comprising:
    a display apparatus;
    a lens;
    a mirror;
    a light source; and
    an optical window,
    wherein the display apparatus comprises a pixel comprising a light-emitting device and a light-receiving device over an insulating layer,
    wherein the lens is between the display apparatus and the optical window,
    wherein the mirror is between the lens and the optical window to have a reflective surface on the optical window side,
    wherein the light source is provided at a position overlapping with neither the display apparatus nor the optical window so that emitted light is incident obliquely on the reflective surface of the mirror,
    wherein the emitted light reflected at the mirror is incident on a target object through the optical window, and
    wherein light reflected by the target object enters the display apparatus through the optical window and the lens.

2. The electronic device according to claim 1, further comprising a light-transmitting plate between the lens and the optical window,
    wherein the mirror is on a surface of the light-transmitting plate.

3. The electronic device according to claim 1,
    wherein the mirror is on a surface of the lens.

4. The electronic device according to claim 1, wherein the mirror is a dielectric multilayer film transmitting visible light and reflecting infrared light.

5. The electronic device according to claim 1, wherein the light source is a laser device or a light-emitting diode emitting infrared light.

6. The electronic device according to claim 1, wherein the optical window is a lens.

7. The electronic device according to claim 1, wherein the light-receiving device comprises a photoelectric conversion layer comprising an organic compound.

8. The electronic device according to claim 1, wherein the light-receiving device has a light-receiving sensitivity peak in an infrared light range.

9. The electronic device according to claim 1, further comprising a filter blocking visible light at a portion overlapping with the light-receiving device.

10. The electronic device according to claim 1,
    wherein the light-emitting device comprises a first electrode over the insulating layer, a second electrode, and an EL layer between the first electrode and the second electrode, and
    wherein the light-receiving device comprises a third electrode over the insulating layer, the second electrode, and an active layer between the third electrode and the second electrode.

11. The electronic device according to claim 1,
    wherein the target object is a user's eyeball or eyelid, and
    wherein the electronic device is configured to detect a blinking action or a movement of the eyeball.

12. The electronic device according to claim 11, wherein the electronic device is configured to estimate a user's fatigue level or perform an input operation with detection of the blinking action or the movement of the eyeball.

13. A goggle-type electronic device comprising two electronic devices in a housing, each of the electronic devices being the electronic device according to claim 1.

14. The electronic device according to claim 1, wherein the reflected light is detected by the light-receiving device.

* * * * *